(12) United States Patent
Petterson et al.

(10) Patent No.: US 9,778,819 B2
(45) Date of Patent: Oct. 3, 2017

(54) DISPLAYING A STREAM OF CONTENT

(71) Applicant: Google Inc., Mountain View, CA (US)

(72) Inventors: Frank Petterson, Redwood City, CA (US); Brian Laird, San Francisco, CA (US); Chikezie Ejiasi, Sunnyvale, CA (US); Anand Agarawala, San Francisco, CA (US); Leslie Ikemoto, Mountain View, CA (US); Daniel Burka, San Francisco, CA (US); Karl Channell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 13/966,997

(22) Filed: Aug. 14, 2013

(65) Prior Publication Data

US 2014/0164938 A1    Jun. 12, 2014

Related U.S. Application Data

(60) Provisional application No. 61/734,926, filed on Dec. 7, 2012.

(51) Int. Cl.
*G06F 3/0482* (2013.01)
*G06F 3/048* (2013.01)
*G06F 3/0485* (2013.01)

(52) U.S. Cl.
CPC ............ *G06F 3/0482* (2013.01); *G06F 3/048* (2013.01); *G06F 3/0485* (2013.01); *G06F 2203/04803* (2013.01)

(58) Field of Classification Search
CPC ................................ G06F 3/048; G06F 3/0482
See application file for complete search history.

(56) References Cited

U.S. PATENT DOCUMENTS

| | | |
|---|---|---|
| 2008/0178125 A1 | 7/2008 | Elsbree et al. |
| 2009/0132942 A1 | 5/2009 | Santoro et al. |
| 2009/0271524 A1 | 10/2009 | Davi et al. |
| 2011/0219307 A1 | 9/2011 | Mate et al. |
| 2012/0005224 A1* | 1/2012 | Ahrens .................. G06Q 10/10 707/769 |
| 2012/0124498 A1* | 5/2012 | Santoro ................. G06F 3/0481 715/765 |
| 2012/0151347 A1 | 6/2012 | McClements, IV |
| 2012/0162266 A1 | 6/2012 | Douglas et al. |

(Continued)

OTHER PUBLICATIONS

International Search Report and Written Opinion for PCT Application PCT/US2013/073445 dated Jul. 9, 2014. 13 pages.

(Continued)

*Primary Examiner* — William Bashore
*Assistant Examiner* — Jeanette J Parker
(74) *Attorney, Agent, or Firm* — Patent Law Works LLP

(57) ABSTRACT

A system and method for generating and providing user interfaces for interacting with a stream of content are disclosed. A system having one or more processors and a memory is configured to perform operations including receiving a stream of content including one or more content items; selecting a content item; determining a tile type for providing the content item based upon an attribute of the content item; populating tile components for the tile type using the content item; organizing content tiles in a dynamic grid using the attribute of the content items; and providing the dynamic grid of content tiles for display.

21 Claims, 30 Drawing Sheets

(56) References Cited

U.S. PATENT DOCUMENTS

| | | | |
|---|---|---|---|
| 2012/0166453 A1 | 6/2012 | Broder | |
| 2012/0210247 A1* | 8/2012 | Khouri | G06Q 10/101 715/751 |
| 2012/0226971 A1 | 9/2012 | Tocchini et al. | |
| 2012/0291068 A1* | 11/2012 | Khushoo | H04N 7/186 725/38 |
| 2013/0124539 A1* | 5/2013 | Lin | G06Q 50/01 707/749 |
| 2014/0129910 A1* | 5/2014 | Kota | G06F 17/211 715/202 |

OTHER PUBLICATIONS

Partial Supplementary European Search Report for European Patent Application No. 138110952, dated Jul. 5, 2016, 6 pgs.

* cited by examiner

DISPLAYING A STREAM OF CONTENT

CROSS-REFERENCE TO RELATED APPLICATIONS

The present application claims priority, under 35 U.S.C. §119, of U.S. Provisional Patent Application No. 61/734,926, filed Dec. 7, 2012, and entitled "Displaying a Stream of Content," the entirety of which is hereby incorporated by reference.

BACKGROUND

The specification relates to displaying a stream of content for a user. Consumers of digital media may have goals of keeping apprised of information in areas they already find interesting and discovering new content that is also enjoyable. Keeping apprised of information can become burdensome in the digital age because of the amount of available information. Also, users are viewing content including that from a social network on multiple different types of devices including smart phones, tablets and desktop computers.

SUMMARY

The specification relates to generating user interfaces for presenting a stream of content. According to one innovative aspect of the subject matter described in this disclosure, a system having one or more processors and a memory is configured to perform operations including receiving a stream of content including one or more content items; selecting a content item; determining a tile type for providing the content item based upon an attribute of the content item; populating tile components for the tile type using the content item; organizing content tiles in a dynamic grid using the attribute of the content items; and providing the dynamic grid of content tiles for display. The tile components of the system can include a reason bar, an author area, a re-share area, a media area, a social bar area, and a comment area. The system may also be configured to perform operations including: receiving an input selecting a tile in the dynamic grid; identifying the tile and content item associated with the input; retrieving additional information related to the content item; and providing the content item and the additional information in a user interface over the dynamic grid. The system may also be configured to perform operations including: receiving a second input; and removing the user interface for display and restoring the display of the dynamic grid of content tiles. The system contains at least one tile that includes a social bar identifying an author of a comment and displaying a portion of the comment. The system has the social bar that is dynamically updated with new authors that have posted comments. The system has the social bar that includes a comment window and different portions of comments are dynamically displayed in the window.

In general, another innovative aspect of the subject matter described in this disclosure may be embodied in a method including: receiving a stream of content including one or more content items; selecting a content item; determining a tile type for providing the content item based upon an attribute of the content item; populating tile components for the tile type using the content item; organizing content tiles in a dynamic grid using the attribute of the content items; and providing the dynamic grid of content tiles for display. The method has the tile components that include a reason bar, an author area, a re-share area, a media area, a social bar area, and a comment area. The method may further include receiving an input selecting a tile in the dynamic grid; identifying the tile and content item associated with the input; retrieving additional information related to the content item; and providing the content item and the additional information in a user interface over the dynamic grid. The method may further include receiving a second input; and removing the user interface for display and restoring the display of the dynamic grid of content tiles. The method contains at least one tile that includes a social bar identifying an author of a comment and displaying a portion of the comment. The method has the social bar that is dynamically updated with new authors that have posted comments. The method has the social bar that includes a comment window and different portions of comments are dynamically displayed in the window.

Another innovative aspect of the subject matter described in this disclosure may be embodied in a computer readable medium storing instructions that when executed by one or more processors cause the one or more processors to perform operations including: receiving a stream of content including one or more content items; selecting a content item; determining a tile type for providing the content item based upon an attribute of the content item; populating tile components for the tile type using the content item; organizing content tiles in a dynamic grid using the attribute of the content items; and providing the dynamic grid of content tiles for display. The computer readable medium may have tile components including a reason bar, an author area, a re-share area, a media area, a social bar area, and a comment area. The computer readable medium may also store instructions to perform operations of: receiving an input selecting a tile in the dynamic grid; identifying the tile and content item associated with the input; retrieving additional information related to the content item; and providing the content item and the additional information in a user interface over the dynamic grid. The computer readable medium may also store instructions to perform operations of: receiving a second input; removing the user interface for display and restoring the display of the dynamic grid of content tiles. The computer readable medium may also have at least one tile including a social bar identifying an author of a comment and displaying a portion of the comment. The computer readable medium may also have the social bar dynamically updated with new authors that have posted comments. The computer readable medium may also have the social bar including a comment window and different portions of comments are dynamically displayed in the window.

In general, another innovative aspect of the subject matter described in this disclosure may be embodied in a method including: identifying a list of commenters, identifying a first comment associated with a first commenter in the list, providing the first comment for display in a comment box, identifying a second comment associated with a second commenter in the list, transitioning from providing the first comment for display to providing the second comment for display; and providing the second comment for display in the comment box. The method may also include providing the list of commenters for display. The method may also include providing an indicator for display that identifies which commenter provided the comment being provided for display. The method may also include receiving an updated content item including a third comment, updating the list of commenters, providing a new list of commenters for display, transitioning to providing the third comment for display; and providing the third comment for display in the comment box. The method may also perform the receiving, updating, providing and transitioning in real-time.

According to one innovative aspect of the subject matter described in this disclosure, a system having one or more processors and a memory is configured to perform operations including identifying a list of commenters, identifying a first comment associated with a first commenter in the list, providing the first comment for display in a comment box, identifying a second comment associated with a second commenter in the list, transitioning from providing the first comment for display to providing the second comment for display; and providing the second comment for display in the comment box. The system may also be configured to perform operations including providing the list of commenters for display. The system may also be configured to perform operations including providing an indicator for display that identifies which commenter provided the comment being provided for display. The system may also be configured to perform operations including receiving an updated content item including a third comment, updating the list of commenters, providing a new list of commenters for display, transitioning to providing the third comment for display; and providing the third comment for display in the comment box. The system may also be configured to perform operations including receiving, updating, providing and transitioning in real-time.

The systems, methods and computer readable medium described below are advantageous in a number of respects. First, the dynamic grid structure of the user interface generated by the system and methods of this disclosure allows use of a common interface across different devices independent of form factor. For example, whether the user is using a smart phone, a tablet or a desktop computer, the user interface and interaction are similar providing ease of use and efficiency of presentation of information. Second, the order of presentation and the size of the tiles can be adapted based on the attributes of the content items being presented in the tile, user preferences and data format of the content. Third, the use of tiles allows the information in the user interface to be dynamically updated as well as allowing the user to transition to obtain more information about content presented in the specific tile. Fourth, the first systems and methods abstract content items and present the more interesting information to the user.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Systems, methods and interfaces are disclosed. While the systems, methods and interfaces of the present disclosure are described in the context of a social network and presenting information from a content stream generated by a social network application, it should be understood that the systems, methods and interfaces can be applied to present various types of other information (e.g., content from heterogeneous data sources).

Figure 1A:
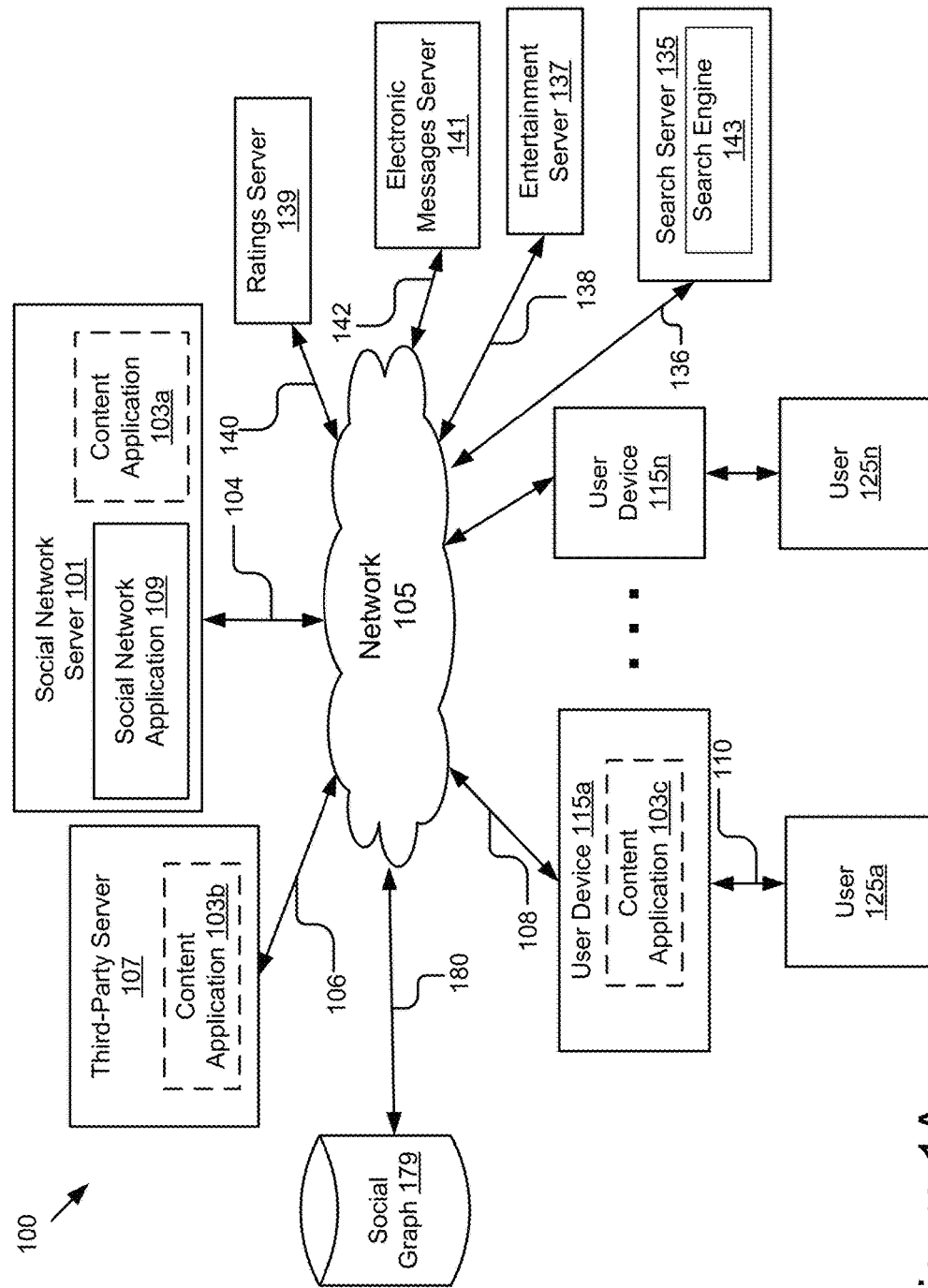
FIG. 1A is a block diagram illustrating an example system for generating a stream of content for display.

FIG. 1A illustrates a block diagram of a system 100 for generating a stream of content for display according to some implementations. The system 100 for generating a stream of content for display includes user devices 115a . . . 115n that are accessed by users 125a . . . 125n, a social network server 101, a third-party server 107, a search server 135, an entertainment server 137, a ratings server 139, an electronic messages server 141, and a social graph 179. In the illustrated implementations, these entities are communicatively coupled via a network 105.

In some implementations, the content application 103a is operable on the social network server 101, which is coupled to the network 105 via signal line 104. The social network server 101 also contains a social network application 109 and a social graph 179. In some implementations, the content application 103a is a component of the social network application 109. Although only one social network server 101 is shown, multiple social network servers may be present. A social network is any type of social structure where the users are connected by a common feature. Examples of a social network include, but are not limited to, blogs, micro blogs and Internet forums. Examples of common features include friendship, family, work, a common interest, etc. The common features are provided by one or more social networking systems, for example those included in the system 100, including explicitly-defined relationships and relationships implied by social connections with other users, where the relationships are defined in a social graph 179. The social graph 179 is a mapping of users in a social network and how they are related to each other.

In some implementations, the content application 103b is stored on a third-party server 107, which is connected to the network 105 via signal line 106. The third-party server 107 includes, for example, an application that generates a website that includes information generated by the content application 103*b*. For example, the website includes a section of embeddable code for displaying a stream of content generated by the content application 103*b*. Furthermore, while only one third-party server 107 is shown, the system 100 could include one or more third-party servers 107.

The user devices 115*a* . . . 115*n* in FIG. 1A are used by way of example. While FIG. 1A illustrates two devices, the description applies to any system architecture having one or more user devices. The user device 115*a* is any computing device that includes a memory and a processor, for example a personal computer, a laptop, a Smartphone, a cellular phone, a personal digital assistant (PDA), etc. The user 125*a* interacts with the user device 115*a* via signal line 110. Although only two user devices 115*a* . . . 115*n* are illustrated, any number of user devices 115*n* may be available to any number of users 125*n*. In some implementations, the system 100 includes a combination of different types of client devices 115. For example, a combination of a personal computer and a mobile phone. The user 125*a* is a human user of the user device 115*a*.

The network 105 enables communications between the user devices 115*a-n*, the social graph 179, the third party server 107, the social network server 101, the ratings server 139, the electronic messages server 141, the entertainment server 137, and the search server 135. Thus, the network 105 can include links using technologies including, for example, Wi-Fi, Wi-Max, 2G, Universal Mobile Telecommunications System (UMTS), 3G, Ethernet, 802.11, integrated services digital network (ISDN), digital subscriber line (DSL), asynchronous transfer mode (ATM), InfiniBand, PCI Express Advanced Switching, etc. Similarly, the networking protocols used on the network 105 can include the transmission control protocol/Internet protocol (TCP/IP), multi-protocol label switching (MPLS), the User Datagram Protocol (UDP), the hypertext transport protocol (HTTP), the simple mail transfer protocol (SMTP), the file transfer protocol (FTP), lightweight directory access protocol (LDAP), Code Division Multiple Access (CDMA), Wideband Code Division Multiple Access (WCDMA), Global System for Mobile communications (GSM), High-Speed Downlink Packet Access (HSDPA), etc. The data exchanged over the network 105 can be represented using technologies and/or formats including the hypertext markup language (HTML), the extensible markup language (XML), etc. In addition, all or some of links can be encrypted using conventional encryption technologies, for example, the secure sockets layer (SSL), Secure HTTP and/or virtual private networks (VPNs) or Internet Protocol security (IPsec). In some implementations, the entities can use custom and/or dedicated data communications technologies instead of, or in addition to, the ones described above. Depending upon the implementation, the network 105 can also include links to other networks.

In some implementations, the network 105 is a partially public or a wholly public network, for example, the Internet. The network 105 can also be a private network or include one or more distinct or logical private networks (e.g., virtual private networks, Wide Area Networks ("WAN") and/or Local Area Networks ("LAN")). Additionally, the communication links to and from the network 105 can be wired or wireless (i.e., terrestrial or satellite-based transceivers). In some implementations, the network 105 is an IP-based wide or metropolitan area network.

The network 105 may have any number of configurations including a star configuration, token ring configuration or other configurations. Furthermore, the network 105 may include a local area network (LAN), a wide area network (WAN) (e.g., the Internet), and/or any other interconnected data path across which multiple devices may communicate. In some implementations, the network 105 may be a peer-to-peer network. The network 105 may also be coupled to or include portions of a telecommunications network for sending data in a variety of different communication protocols. In some implementations, the network 105 includes short-wavelength communication networks or a cellular communications network for sending and receiving data including via short messaging service (SMS), multimedia messaging service (MMS), hypertext transfer protocol (HTTP), direct data connection, wireless application protocol (WAP), electronic messages, etc.

In some implementations, the network 105 helps to form a set of online relationships between users 125, for example, those provided by one or more social networking systems including explicitly-defined relationships and relationships implied by social connections with other online users, where the relationships form a social graph 179.

The content application 103 receives data and generates a stream of content for display. In some implementations, the content application 103 receives data and generates a stream of content for display from heterogeneous data sources. In some implementations, the content application 103 receives data from heterogeneous data sources including a third-party server 107, a social network server 101, user devices 115*a* . . . 115*n*, a search server 135 that is coupled to the network 105 via signal line 136, an entertainment server 137 that is coupled to the network 105 via signal line 138, a ratings server 139 that is coupled to the network 105 via signal line 140, an electronic messages server 141 that is coupled to the network 105 via signal line 142. In some implementations, the search server 135 includes a search engine 143 for retrieving results that match search terms from the Internet.

A public stream of content with multiple users is referred to as a channel and is available for other users. In some implementations, the content application 103 generates a channel for a topic, receives candidate content items from heterogeneous data sources, generates a stream of content for the channel from the candidate content items and populates the channel with the stream of content for the channel. In some implementations, the stream of content for the channel has a same or similar topic to the channel (e.g., each content item is associated with keywords related to the channel topic).

In some implementations, the content application 103 personalizes the channel for a user by rescoring the candidate content items for a user and generating a personalized content stream. For rescoring the candidate content items for a user, the content application 103 compares the candidate content items to a model. In some implementations, the content application 103 updates the model based at least in part on the user's selection and generates an updated content stream according to the updated model.

Figure 1B:
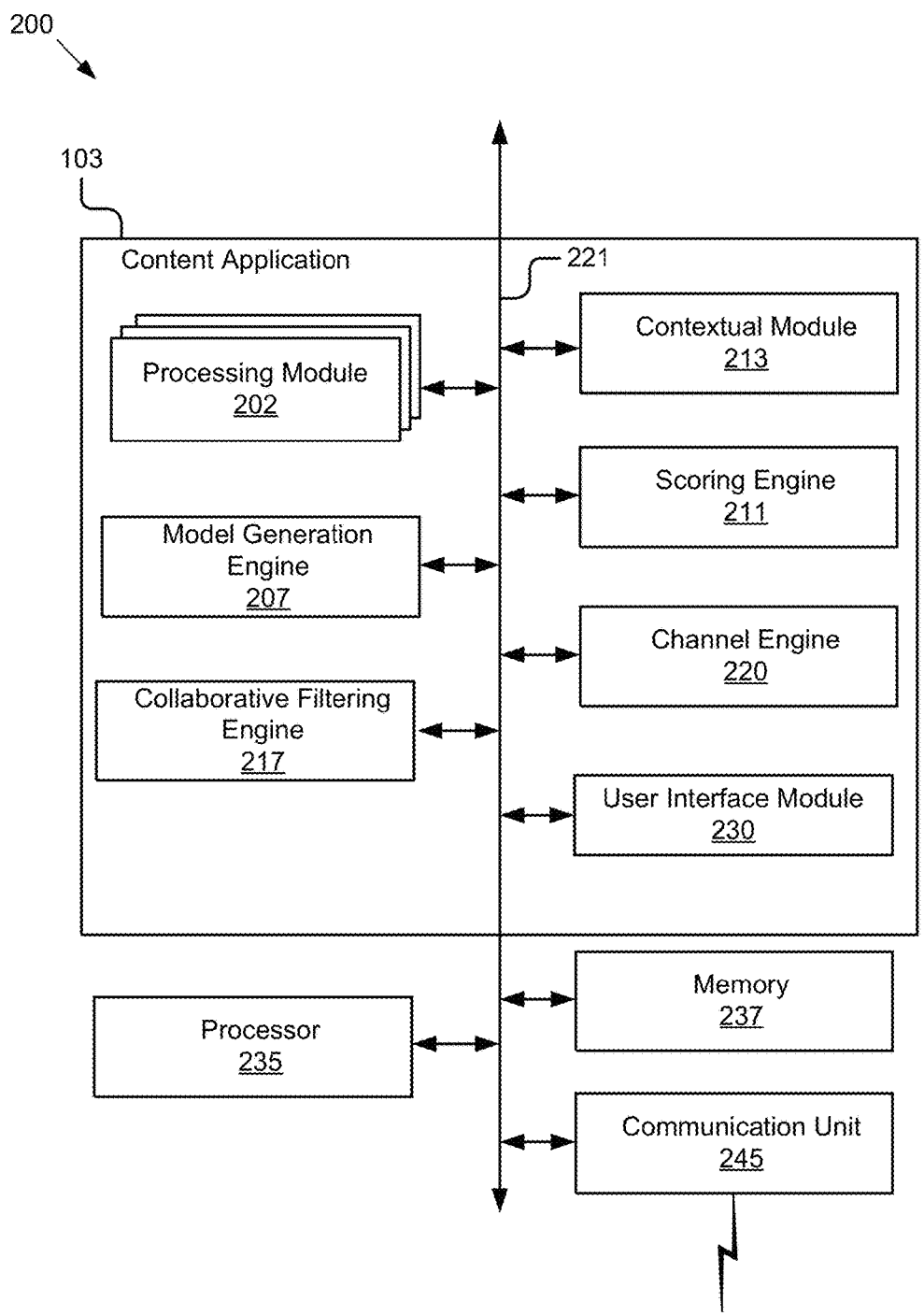
FIG. 1B is a block diagram illustrating an example content application for producing content items.

Referring now to FIG. 1B, the content application 103 is shown in more detail according to one implementation. FIG. 1B is a block diagram of a computing device 200 that includes the content application 103, a communication unit 245, a memory 237 and a processor 235. In some implementations, the computing device 200 is a social network server 101. In some implementations, the computing device 200 is a third-party server 107. In some implementations, the computing device 200 is a user device 115*a*.

The communication unit 245 sends data to and receives data from the various system 100 components (e.g., user devices 115, third party application server 107, social network server 101, etc.). The communication unit 245 is coupled to the bus 221. In some implementations, the communication unit 245 includes a port for direct physical connection to the network 105 or to another communication channel. For example, the communication unit 245 includes a USB, SD, CAT-5 or similar port for wired communication with the network 105. In some implementations, the communication unit 245 includes a wireless transceiver for exchanging data with the network 105, or with another communication channel, using one or more wireless communication methods, such as IEEE 802.11, IEEE 802.16, BLUETOOTH®, near field communication (NFC) or another suitable wireless communication method.

The processor 235 includes an arithmetic logic unit, a microprocessor, a general purpose controller or some other processor array to perform computations and provide electronic display signals to a display device. The processor 235 is coupled to the bus 221 for communication with the other components. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 1B, multiple processors may be included. The processing capability may be limited to supporting the display of images and the capture and transmission of images. The processing capability might be enough to perform more complex tasks, including various types of feature determination and sampling. The computing device 200 also includes an operating system executable by the processor 235 including but not limited to WINDOWS®, MacOS X, Android or UNIX® based operating systems. Other processors, operating systems, sensors, displays and physical configurations are possible.

The memory 237 stores instructions and/or data that may be executed by processor 235. The memory 237 is coupled to the bus 221 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the content application 103 includes a processing module 202, a model generation engine 207, a contextual module 213, a scoring engine 211, a channel engine 220, a collaborative filtering engine 217, and a user interface module 230. These components are coupled for communication and interaction by bus 221. In some implementations, the activities of the content application 103 or a component thereof 202, 207, 211, 213, 217, 220, 230 are subject to user consent.

The processing module 202 may be software including routines for receiving information about a user's interests and social connections and for processing the information. In some implementations, the processing module 202 is a set of instructions executable by the processor 235 to provide the functionality described below for processing the information. In some implementations, the processing module 202 is stored in the memory 237 of the computing device 200 and is accessible and executable by the processor 235. In some implementations, the processing module 202 is adapted for cooperation and communication with the processor 235 and other components of the computing device 200 via the bus 221.

The processing module 202 receives information via the communication unit 245 about users from user input and/or prior actions of a user across a range of heterogeneous data sources including search (for example, web, video, news, maps, alerts), entertainment (for example, news, video, a personalized homepage, blogs, a reader, gadget subscriptions), social activity (for example, interactions through electronic messages, profile information, text messaging including short message service (SMS), micro blogs, geographical locations, comments on photos, a social graph 179, and other social networking information) and activity on third-party sites (for example, websites that provide ratings, reviews and social networks where users indicate that they approve of content). This information is derived, for example, from a user's search history, browsing history and other interactions with the Internet.

In some implementations, there are multiple processing modules 202 that each receive data from a different heterogeneous data source. In some implementations, the data is received by the same processing module 202. The processing module 202 transmits the data to the memory 237 for storage. In some implementations, the memory 237 partitions the data from each heterogeneous data source in a separate data storage location. In some implementations, the data from heterogeneous data sources is stored in the same location in the memory 237. In some implementations, the memory 237 partitions the model and the stream of content into separate storage locations as well.

The model generation engine 207 may be software including routines for retrieving the data from the memory 237 and generating a model for a user based on the data. In some implementations, the model generation engine 207 may be a set of instructions executable by the processor 235 to provide the functionality described below for generating the model. In some implementations, the model generation engine 207 is stored in the memory 237 of the computing device 200 and is accessible and executable by the processor 235. In some implementations, the model generation engine 207 may be adapted for cooperation and communication with the processor 235 and other components of the computing device 200 via bus 221.

The model generation engine 207 may receive user information from a variety of sources including, for example, queries, clicks, news clicks, gadgets, electronic message interactions, etc.; determine features from the information; and generate a model of the user based on the determined features. The model may include various types of relevance of items to users, along with floating point values to indicate the extent to which the relevance holds. Examples of types of relevance include the relevance of an item's source to a user, the relevance of an item's primary location to a user, and the relevance of an item to a list of interests of a user. The interests are generated from explicit information and inferred information. Explicit information is derived, for example, from a user's list of interests on a social network or indicating that the user found a particular content item interesting. Inferred information takes into account a user's activities.

In some implementations, the model generation engine 207 may also generate a model that contains several pieces of global meta-information about the user's consumption patterns including how frequently the user consumes the stream of content and global statistics on how likely the user is to re-share various types of items. Lastly, the model includes a sequence of weights and multipliers that are used to make predictions about the user's likelihood of clicking on, sharing or otherwise engaging with content stream items.

In some implementations, the model generation engine 207 generates the model from the data across the heterogeneous data sources. In some implementations, the model generation engine 207 builds extensions to the model that employ the patterns of behavior of other users. For example, the model predicts the user's behavior based on the reaction of similar users. The data for the other users may be anonymized before it is incorporated into the model.

In some implementations, the model generation engine 207 may also update a model based on the user's reaction to the stream of content. The user's reaction includes, for example, selecting a button for reading items that are similar to a content item that is part of the stream of content, removing an interest from the list of interests and choosing related interests. Responsive to the user's reaction, the model generation engine 207 updates the model. When the user selects the button for reading similar content items, the model generation engine 207 adds the corresponding interest to the model. When the user removes an interest from the list, the model generation engine 207 adjusts the model accordingly, e.g., by deleting the interest from the model.

The contextual module 213 may be software including routines for identifying contextual clues from a request, e.g., a request for a content stream for a user and/or a request for a channel. In some implementations, the contextual module 213 may be a set of instructions executable by the processor 235 to provide the functionality described below for identifying contextual clues. In some implementations, the contextual module 213 may be stored in the memory 237 of the computing device 200 and is accessible and executable by the processor 235. In either implementation, the contextual module 213 may be adapted for cooperation and communication with the processor 235 and other components of the computing device 200 via the bus 221.

In some implementations, the contextual module 213 may receive a request for a stream of content for a user or a request for a channel each time the user visits a website or activates an application that includes the content application 103. In some implementations, the user requests the stream of content or requests the content stream from the channel. Regardless of the request, the contextual module 213 receives the request and determines contextual clues from the request. For example, the contextual module 213 determines the location of the user (based, for example, on the user's IP address), the time of day and any other contextual clues. The contextual module 213 transmits the contextual clues to the scoring engine 211.

The scoring engine 211 may be software including routines for generating a stream of content for a user or a channel from candidate content items and for personalizing a channel for a user. In some implementations, the scoring engine 211 may be a set of instructions executable by the processor 235 to provide the functionality described below for generating a stream of content for a user and for personalizing a channel for a user. In some implementations, the scoring engine 211 may be stored in the memory 237 of the computing device 200 and is accessible and executable by the processor 235. In some implementations, the scoring engine 211 may be adapted for cooperation and communication with the processor 235 and other components of the computing device 200 via bus 221.

In some implementations, the scoring engine 211 queries heterogeneous data sources for candidate content items related to search terms, receives the candidate content items and compares the candidate content items to the model to determine whether the user would find the candidate content items interesting. In some implementations, the heterogeneous data sources include a search engine 143, an entertainment server 137, an electronic messages server 141, a ratings server 139, a social network server 101, and a third-party server 107 as illustrated in FIG. 1A.

When the request is for a user, the query is derived from the user's interests, social connections and, in some implementations, recent search terms input by the user. When the request is for a channel, the query includes the topic and keywords for the channel. In some implementations, the scoring engine 211 also uses contextual clues transmitted from the contextual module 213 to further narrow the number of candidate content items.

In some implementations, the scoring engine 211 first performs the query and then compares the results to the model to determine whether the user would find the candidate content items interesting. In some implementations, these steps are performed simultaneously. In some implementations, the scoring engine 211 compares candidate content items to the model and then filters the results according to the subject matter of the queries.

The scoring engine 211 may determine interestingness based on social relevance and an interest match between the item and the user. Social relevance can be used to measure a likelihood that the user would be interested in an item based on information from the user's social graph (e.g., how other people with similar demographics reacted to an item). For example, assuming the user lives in the United States and enjoys pop music, the user might be interested in content items about a new artist named Artist X. The interest match of the item to the user is determined based on similarity of the content item to the model.

Interestingness is measured by calculating a score for each candidate content item. In some implementations, the scoring engine 211 incorporates historical interaction feeds into the scoring. In some implementations, the candidate items are not displayed unless their candidate scores exceed a certain threshold. Once the scores are calculated and the threshold is exceeded, the scoring engine 211 generates a stream of content for a user that is ordered according to the candidate content item scores.

In some implementations, the scoring engine 211 may also generate an explanation for each item in the stream of content for display. The explanation is presented in a variety of ways including a tag that contains the subject matter of the content item (for example, skiing) or a more detailed explanation (for example, your friends enjoyed this article). Other explanations include that the content item matches a specific user interest or is similar to other content items that the user has endorsed in the past. The user's reaction to the explanation may be used to further refine the model.

In some implementations, the scoring engine 211 may personalize a channel for a user. The scoring engine 211 queries the channel for content items in the stream of content for the channel based on the topic of the channel. The scoring engine 211 receives candidate content items that match the query. In some implementations, the content items in the channel are directly transmitted from the channel engine 220 to the scoring engine 211. In some implementations, the scoring engine 211 queries a data storage server 265 (discussed below with reference to FIG. 2) or the memory 237 for candidate content items based on the topic and keywords for the channel.

The scoring engine 211 compares the candidate content items to a model and calculates a score for each candidate content item using the model and based upon interestingness of the candidate content item to the user. In some implementations, the scoring engine 211 receives the contextual clues from the contextual module 213 and uses the contextual clues to further narrow the number of candidate content items.

In some implementations, the scoring engine 211 selects a set of content items from the candidate content items according to their scores. The scoring engine 211 identifies the content items in the selected content items and in the stream of content for the user, removes the duplicate content items from the selected set of content items and generates a stream of content for the channel (e.g., a personalized channel for the user) from the selected content items for a user. In some implementations, the scoring engine 211 distributes the personalized channel for the user into the overall content stream for the user.

Referring still to FIG. 1B, the collaborative filtering engine 217 may be software including routines for generating additional candidate content items with a social component through collaborative filtering and transmitting the additional candidate content items to the scoring engine 211 that were derived from collaborative filtering. In some implementations, the collaborative filtering engine 217 may be a set of instructions executable by the processor 235 to provide the functionality described below for generating additional candidate content items. In some implementations, the collaborative filtering engine 217 may be stored in the memory 237 of the computing device 200 and is accessible and executable by the processor 235. In some implementations, the collaborative filtering engine 217 may be adapted for cooperation and communication with the processor 235 and other components of the computing device via bus 221.

The collaborative filtering engine 217 may obtain candidate content items that are socially relevant from a stream of content for a user derived from people with whom the user has a relationship and transmits the candidate content items to the scoring engine 211. The collaborative filtering engine 217 receives information about the relationships from the social graph 179. For example, the stream of content for a user is derived from friends in a social network or people to which the user frequently sends electronic messages. The more important a person appears to be to the user, the more likely that the user is interested in the content item. Thus, in some implementations, the collaborative filtering engine 217 applies a weight to candidate content items based on the social relationship of the user to the friend. For example, candidate content items generated by or consumed by users that are friends receive higher weights than candidate content items from second-generation friends of the user (e.g., a friend of a friend).

The collaborative filtering engine 217 may increase the weights applied to candidate content items from friends when the user positively responds to the items. For example, when the user comments on the item or indicates that the user found the item interesting, the collaborative filtering engine 217 increases the weight of that friend so that more candidate content items from that friend become part of the stream of content for the user.

The channel engine 220 may be software including routines for generating a channel for a topic, retrieving candidate content items based on the topic and keywords, generating a stream of content for the channel from the candidate content items and populating the channel with the stream of content for the channel. In some implementations, the channel engine 220 may be a set of instructions executable by the processor 235 to provide the functionality described below for generating the channel populated with the stream of content for the channel. In some implementations, the channel engine 220 may be stored in the memory 237 of the computing device 200 and is accessible and executable by the processor 235. In either implementation, the channel engine 220 may be adapted for cooperation and communication with the processor 235 and other components of the computing device 200 via the bus 221.

In some implementations, the channel engine 220 may determine a topic for a channel (e.g., a bicycler) and identifies corresponding keywords (e.g., bicycle, bike, bicycling, biking, cycle, cycling, racer). In some implementations, the channel engine 220 receives a request for creating a channel from third parties or individuals. The request for creating a channel includes a topic and possibly a brief description of the channel that the channel engine 220 uses to generate keywords. For example, the channel engine 220 receives a request for creating a channel for a topic about birds. In some implementations, the channel engine 220 determines the keywords for this channel of birds, for example, birds, parrots, cockatiels, eagles, owls, pigeons, etc. The channel engine 220 generates a channel for the determined topic.

The channel engine 220 may query heterogeneous data sources for candidate content items based on the keywords, receive the candidate content items and select a set of content items from the candidate content items according to their global scores. In some implementations, the global score represents the popularity of a candidate content item among users (e.g., based on clicks, views, unique views, ratings, resharing or another metric indicating popularity). Examples of heterogeneous data sources include a search engine 143, an entertainment server 137, an electronic messages server 141, a ratings server 139, a social network server 101, and a third-party server 107. The query is derived from keywords associated with the topic. For example, the channel engine queries the search engine 143 for items including gourmet, cuisine and restaurant because the topic of the channel is gourmand.

In some implementations, the channel engine 220 first performs the query based on keywords and then selects the results according to their global scores. For example, the channel engine 220 selects a set of content items, each with a global score satisfying a threshold, from the candidate content items. In some implementations, the query and selection are performed simultaneously, e.g., the channel engine 220 queries heterogeneous data sources for candidate content items based on the keywords and their associated global scores. For example, the channel engine 220 queries a data storage server (not shown) for items containing the word skiing and with global scores higher than a threshold amount. The data storage server is further described below with reference to FIG. 2. In some implementations, the channel engine 220 selects from the candidate content items based on their global scores and then filters the results according to the keywords. In many of these examples, the channel engine 220 receives a set of candidate content items related to the topic that is popular.

The channel engine 220 generates a stream of content for the channel using the selected content items and populates the channel with the stream of content for the channel. Once the channel is created, the channel engine 220 transmits the stream of content for the channel to the user interface module 230 for incorporation into a user interface that is displayed to users. In some implementations, the stream of content is stored in the memory 237 for a data storage server 265.

In some implementations, the channel engine 220 updates the channel periodically (e.g., every hour, day, week, or month) and invites and accepts people to join the channel as members/users. In some implementations, the channel engine 220 also receives input or activities from users through the user interface module 230 and publishes these activities in the channel.

In some implementations, the channel engine 220 determines a reputation for each user in the channel based on reactions to the user's submitted content and according to a level of satisfaction of one or more rules. The channel engine 220 assigns a reputation to each user indicating whether a user is trustworthy. In some implementations, a user's reputation is based on whether the user submits content that a threshold number of other users read, watch or positively react to by submitting comments or by providing indications of approval for the content. For example, the channel engine 220 assigns a high reputation indicating trustworthiness when the user exceeds a threshold. In another example, the channel engine 220 assigns a low reputation indicating trustworthiness when the user exceeds a threshold.

The channel engine 220 determines whether to publish content items submitted by the users in the channel based on the reputations of the users and arranges the content items in the stream of content for the channel according to a ranking of the content. In some implementations, the channel engine 220 automatically publishes the content items submitted by users with high reputations in the channel. In some implementations, the channel engine 220 asks a moderator or a user with a high reputation for approval to publish content items from users with low reputations.

The channel engine 220 also deletes obsolete content items and items older than a certain period of time, for example, a month. In some implementations, the channel engine 220 identifies the content items in the stream of content for the channel and in a stream of content for a user as well, removes duplicate content items from the stream of content for the channel and distributes the stream of content for the channel into the stream of content for the user. In some implementations, the channel engine 220 transmits the stream of content for the channel to the scoring engine 211 to remove the duplicates.

In some implementations, the channel engine 220 further refines the topic of the channel based on the activities of the users. In some implementations, the channel engine 220 divides a channel into two or more channels with related topics. For example, the channel engine 220 creates two new channels from the gourmand channel: for vegetarian gourmands and another for carnivorous gourmands. In some implementations, a new channel with a narrowed topic is derived from a current channel based on user feedback. In some implementations, the channel engine 220 generates a new channel for a narrowed topic, for example, a sushi channel generated from a gourmand channel.

A public stream of content with multiple users is referred to as a channel and is available for other users. The users join the channel and the channel appears as part of a user's stream of content. In some implementations, the channel is a bucket and each time a content item is placed in the bucket, the channel engine 220 automatically routes the item to the user. In some implementations, the user selects the channel button generated by the user interface module 230 to view the items in the bucket.

There are three different ways to implement a channel: (1) an algorithmic channel; (2) a moderated channel; and (3) an un-moderated channel. The user inputs information for creating an algorithmic channel by specifying different entities and sources (e.g. 5, 15, 20, etc.) that collectively pull together content about a particular interest. Other users subscribe to the channel by following it or indicating that they approve of the stream of content. Other implementations exist. For example, a channel may be a mix of two or more of the ways described.

For a moderated channel, at least one moderator is specified. In some implementations, the creator of the channel is automatically designated as a moderator. Other moderators are designed via the user interface. The user interface module 230 presents the moderator with candidate content items to include in the channel from various places including items that match a query for the specified interest and other users. When the moderator approves a candidate content item, it appears in the content stream for the channel. Other users offer content to the channel by indicating that they approve of an item in their content stream. Content items from other users are designed as candidate content items until the moderator approves or rejects them.

For an un-moderated channel, any user can join the channel and add an item to the channel's content stream by approving of an item. Approved items are sorted by their global scores and subsequently modified in response to the item receiving many views, indications of approval and comments from users that are members of the channel. By rearranging the content items according to user responses, the stream of content of the channel is effectively moderated.

The user interface module 230 may be software including routines for generating instructions for displaying a user interface on a user device 115 that includes the stream of content for a user including an overall stream of content and a channel stream of content, receives user feedbacks, allows the user to add or remove explicit interests and generates a widget for display on websites that include an option to share the articles in the channel. The user interface can be displayed as part of another application, for example a social network, or as its own standalone application. In some implementations, the user interface module 230 may be a set of instructions executable by the processor 235 to provide the functionality described below for providing a stream of content for a user or a channel. In some implementations, the user interface module 230 may be stored in the memory 237 of the computing device 200 and is accessible and executable by the processor 235. In some implementations, the user interface module 230 is adapted for cooperation and communication with the processor 235 and other components of the computing device 200 via bus 221. The operation of the user interface module 230 and user interfaces generated by it are described in more detail below with reference to FIGS. 3A-11.

Figure 2:
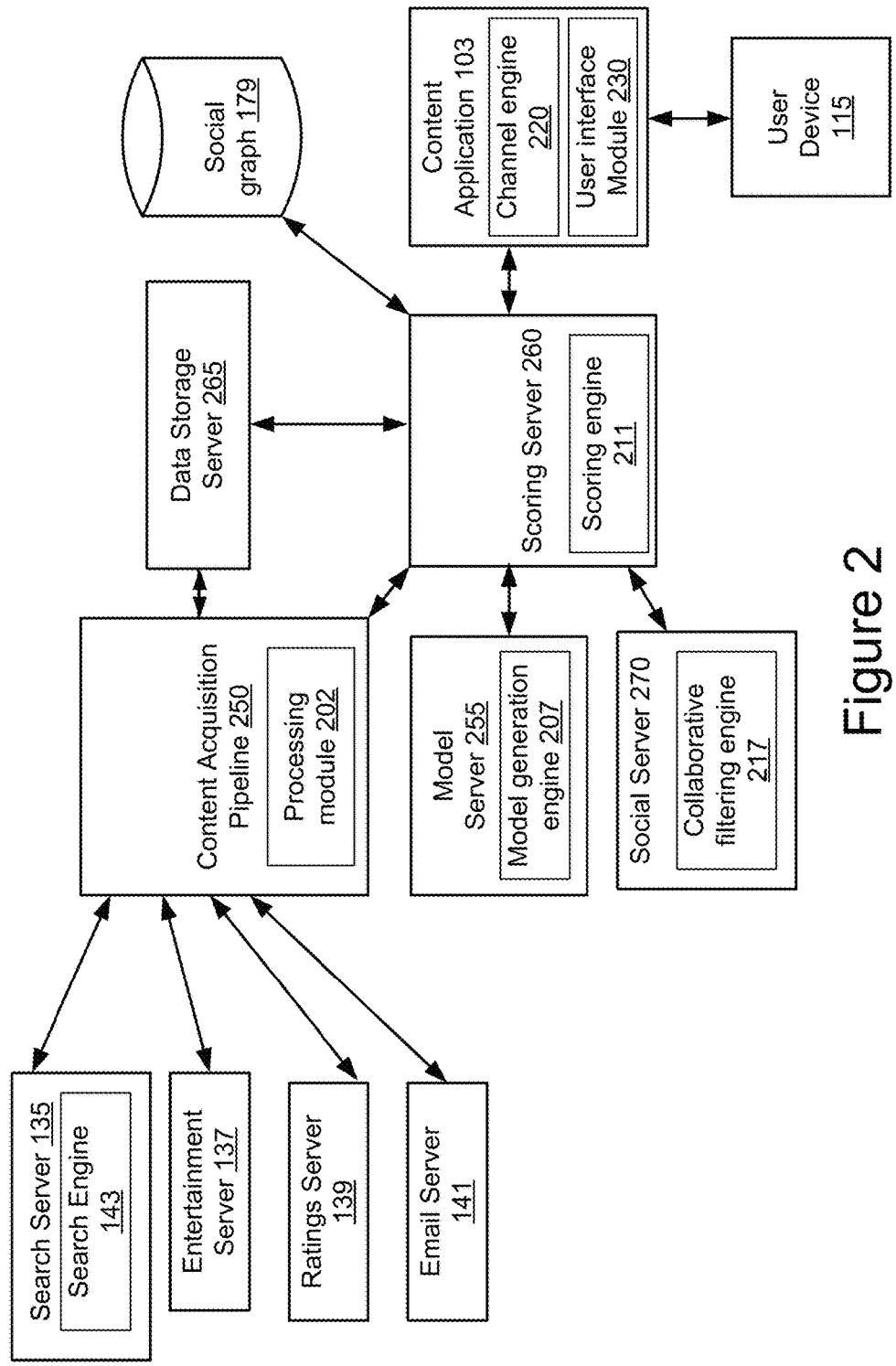
FIG. 2 is a block diagram illustrating an example system for generating a stream of content for display.

FIG. 2 is a block diagram illustrating another implementation of a system for generating a stream of content for display. In the illustrated implementation, the components of the content application 103 are divided among various servers so that the information is efficiently processed. The illustrated system includes a search server 135, an entertainment server 137, a ratings server 139, an electronic messages server 141, a content acquisition pipeline 250, a data storage server 265, a model server 255, a scoring server 260, a social graph 179, a social server 270, and a content application 103.

In some implementations, the heterogeneous data sources (e.g., the search server 135, entertainment server 137, ratings server 139, and electronic messages server 141) are crawled by a content acquisition pipeline 250. In some implementations, the heterogeneous data sources transmit the content items to the content acquisition pipeline 250.

The content acquisition pipeline 250 includes a processing module 202 for annotating the content items with specific tags, for example, features and a global score generated by the scoring engine 211, and processes the data about user activities. In some implementations, the activities described herein are subject to the user consenting to data collection. Once the content items are annotated, the processing module 202 transmits the data to the data storage server 265. The data storage server 265 indexes the features of each content item and stores them in at least one database. In some implementations, the content items are organized according to an identification format (SourceType#UniqueItemID, for example, "VIDEOSERVICE#video_id" and "NEWS#doc_id"), an item static feature column that holds an item's static features (for example, title, content, content classification, etc.), an item dynamic feature column that holds an item's dynamic features (for example, global score, number of clicks, number of following, etc.), a source (src) static feature column where the source is a publisher of an item (for example, Newspaper A in news, video uploader A in Video Hosting Site A, etc.), a src dynamic feature column holds the source's dynamic features, a content column holds activities that were used to create activities and a scoring feature holds a message that is used for user scoring.

In some implementations, the data storage server 265 dynamically phases out the content items. For example, news items expire after 24 hours, videos expire after 48 hours and feeds are kept for 24 hours or only the 10 most recent items are kept, while the rest of the items are phased out.

The content acquisition pipeline 250 also transmits the content items to the scoring server 260 for a global user ranking The global scores are transmitted from the scoring server 260 to the data storage server 265, which stores the global scores in association with the content items. The global scores are helpful for organizing the content items in the data storage server 265.

Turning now to the model server 255, the model server 255 receives the user activity from the processing module 202 or the data storage server 265. The model generation engine 207 generates the model based on user input and/or prior actions. The model server 255 transmits a model to the scoring server 260 periodically or upon request.

In some implementations, the scoring server 260 requests the model responsive to receiving a request for a stream of content for a user or a request for a channel from the user. The scoring server 260 receives the model from the model server 255. The scoring server 260 requests and receives user candidates from the social graph 179. The scoring server 260 requests and receives candidate content items from the data storage server 265. The scoring server 260 requests and receives candidate content items from people that the user is connected to in the social graph 179 from the collaborative filtering engine 217 that is stored on the social server 270. The candidate content items from the social server 270 are pre-scored and, in some implementations, the unread candidate content items are saved to a cache on the social server 270. These items are saved to a cache because the quantity of social updates can be large enough that performing the scoring during write time enables faster reads.

The scoring engine 211 compares the candidate content items to the model and scores the candidate content items. In the case of candidate content items from the social server 270, the scoring engine 211 receives the candidate content items from the social server 270, compares the candidate content items to the model and rescores the candidate content items according to the model. The scoring engine 211 generates a stream of content for a user based on the scored candidate content items and transmits the stream of content for a user to the content application 103.

The content application 103 includes a channel engine 220 as described above and a user interface module 230 that receives the stream of content for a user from the scoring server 260 and displays it in a user interface. In some implementations, the user interface module 230 generates a widget for display on third-party websites that allows a user to share content with the channel. Additionally, the user interface module 230 provides the user with a user interface for reviewing the content items, retrieving additional information about a specific content item, transitioning between different content items, and taking various actions with regard to a content item.

Figure 3A:
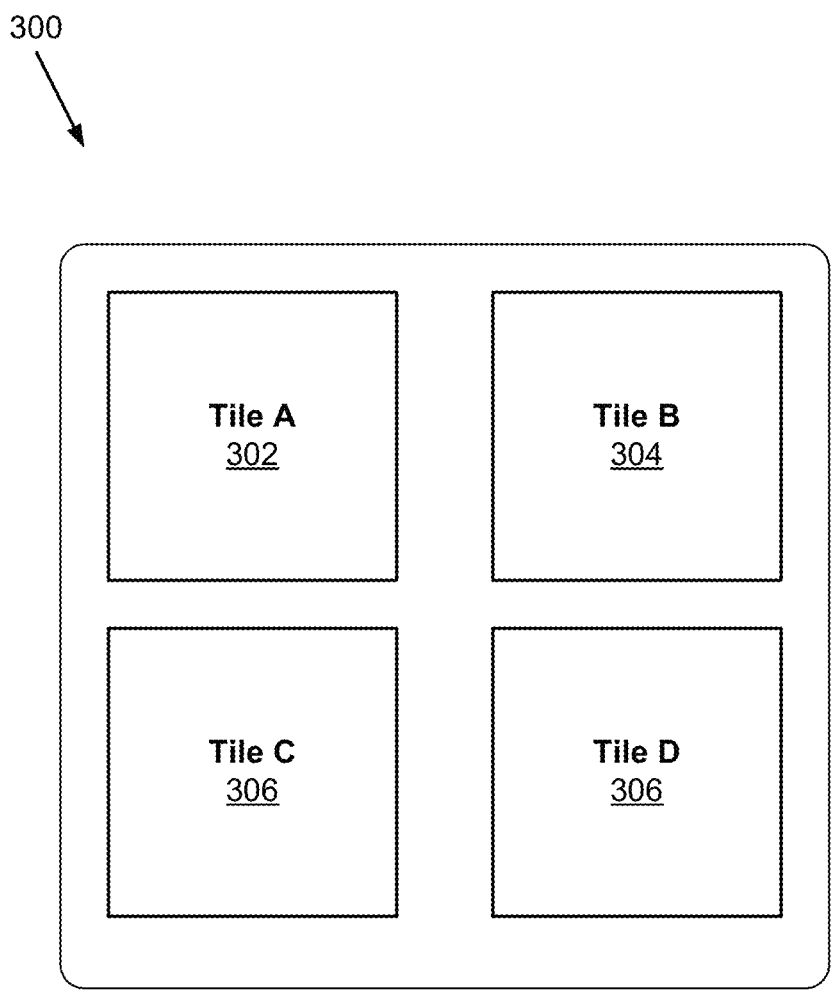
FIGS. 3A-3K are graphic representations of an example user interfaces for a dynamic grid that includes tiles with content.
Figure 3B:
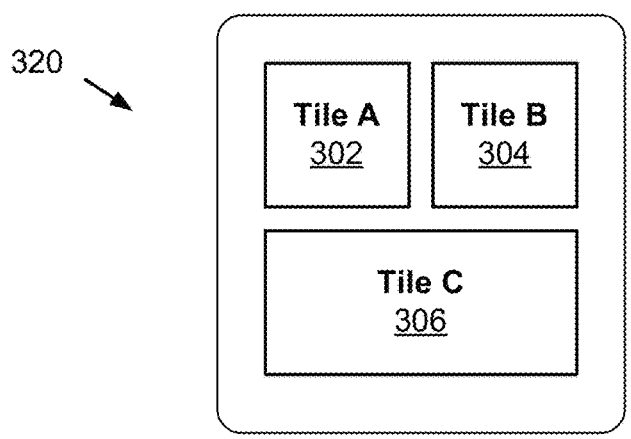
Figure 3C:
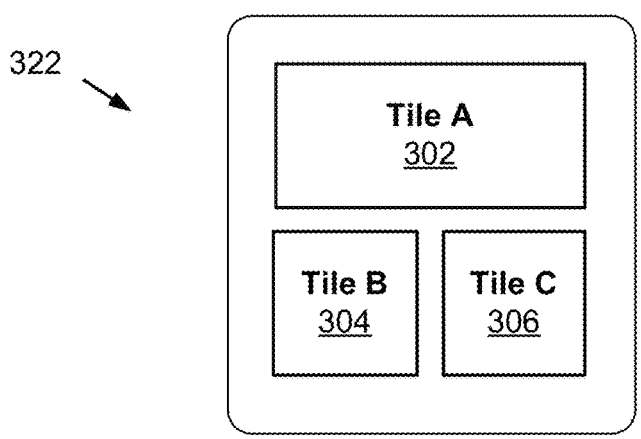
Figure 3D:
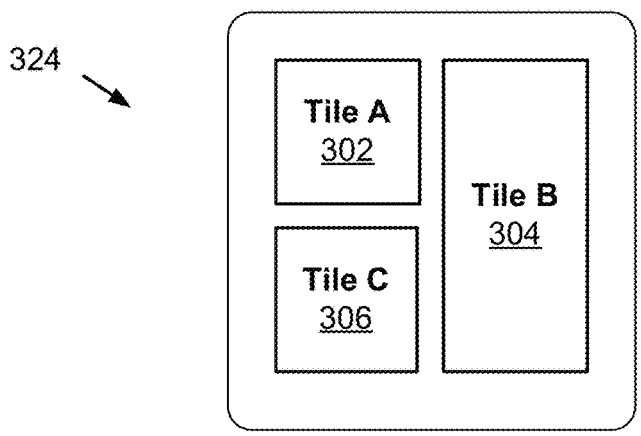
Figure 3E:
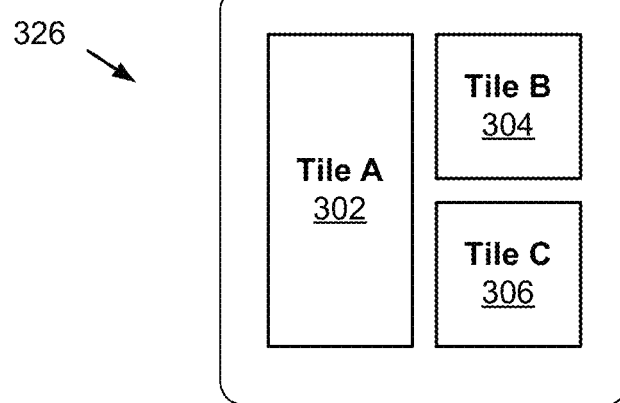
Figure 3F:
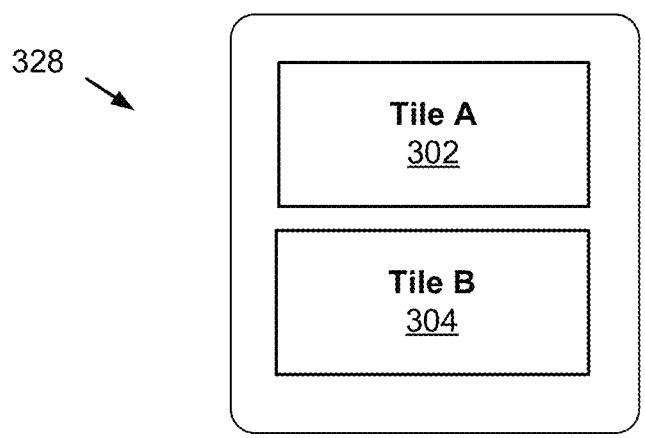
Figure 3G:
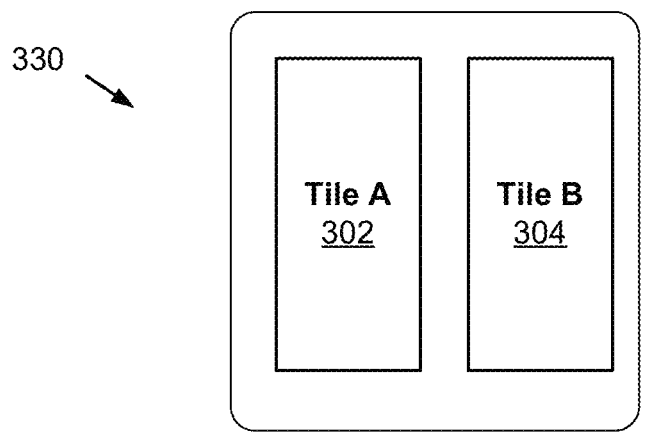
Figure 3H:
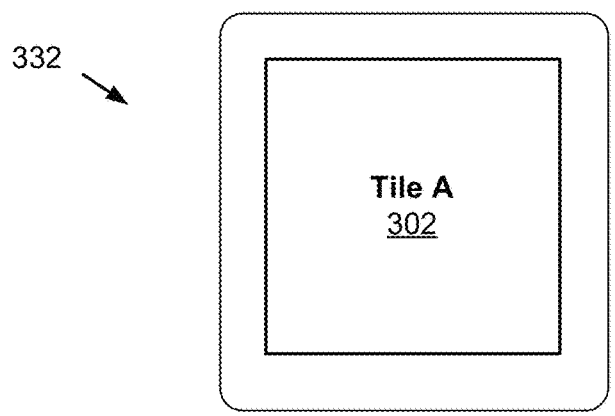

Referring now to FIGS. 3A-3K, graphic representations of various implementations of the user interface 300 of the present disclosure are described. The user interface module 230 advantageously provides a user interface 300 that includes a fluid grid structure with a plurality of tiles. While the interface 300 is described in the context of a 2×2 grid implementation of tiles, it should be understood that different grid increments may be possible. FIGS. 3A-3H illustrate an implementation of the user interface 300 where the grid increment is 2×2 and there are three possible tile sizes: small, medium and large. In this example and as shown in FIG. 3A, the user interface 300 has a size of approximately two small tiles by two small tiles. Thus as shown in FIG. 3A, assuming the content items to be presented in the user interface 300 are represented by four small tiles, then tiles A 302, B 304, C 306 and D 308 are laid out in a 2×2 grid covering most of the displayable area of the user interface 300. However, the user interface 300 also allows medium-sized tiles and large-size tiles. The medium-sized tiles are approximately double the size of a small tile; and thus, may be 2 small tiles wide and 1 small tile vertically or 1 small tile wide and 2 small tiles vertically. Examples of such tiles are shown in FIG. 3C (see tile A 302) and FIG. 3D (see tile B 304), respectively. These tiles can be positioned within the user interface 300 in the top portion, the bottom portion, left portion of the right portion. The large-size tiles are double the size of a medium-sized tile or four times as large and small tile. An example is shown in FIG. 3H (see tile A 302). As described in more detail below with reference to FIGS. 9 to 11, the systems and methods of the present disclosure advantageously select a tile size and a tile position based on the attributes of the content item being presented to the user. Thus, the grid structure shown in FIGS. 3A-3K is dynamic in at least two respects. First, the size of each tile is dynamically sized based upon individual attributes of the content items and the content itself. For example, tiles with content more interesting to the user may be presented in a larger tile than less interesting content. In another example, tiles that include a photograph may be displayed larger than tiles that include only textual content. Second, the order in which the tiles are presented is dynamic, again based on the content of the item as well as the attributes of the content. For example, tiles with content more interesting to the user may be presented before those with less interesting content.

FIGS. 3A-3H illustrates possible layouts for content items from the stream of content using the dynamic grid that is 2×2 and has small, medium and large tiles sized as described above. As noted above, FIG. 3A illustrates a graphic representation of an example user interface 300 with four small tiles (tiles A 302, B 304, C 306 and D 308) laid out in a 2×2 array. FIG. 3B illustrates a graphic representation of an example user interface 320 having two small tiles (tile A 302 and tile B 304) and a medium-sized tile (tile C 306). The small tiles 302, 304 are both positioned above the medium-sized tile 306. FIG. 3C illustrates a graphic representation of an example user interface 322 having a medium-sized tile (tile A 302) and two small tiles (tile B 304 and tile C 306). The medium-sized tile 302 is positioned above the small tiles 304 and 306. FIG. 3D illustrates a graphic representation of an example user interface 324 having a medium-sized tile (tile B 304) and two small tiles (tile A 302 and tile C 306). The medium-sized tile 304 is positioned on the right side of the user interface 324 with the two small tiles (tile A 302 and tile C 306) stacked vertically to the left of the medium tile (tile B 304). FIG. 3E illustrates a graphic representation of an example user interface 326 having a medium-sized tile (tile A 302) and two small tiles (tile B 304 and tile C 306). The medium-sized tile 302 is positioned on the left side of the user interface 326 with the two small tiles (tile B 304 and tile C 306) stacked vertically to the right of the medium tile (tile A 302). FIG. 3F illustrates a graphic representation of an example user interface 328 having two medium-sized tiles (tile A 302 and tile B 304) with one medium tile above the other. FIG. 3G illustrates a graphic representation of an example user interface 330 having two medium-sized tiles (tile A 302 and tile B 304) with the medium tiles side by side. FIG. 3H illustrates a graphic representation of an example user interface 332 having one large tile (tile A 302) that occupies most of the user interface. One particular advantage with regard to the dynamic grid described above is that the 2×2 grid supports rotation of devices. In other words, the presentation of the data in tiles allows the device to be rotated from a portrait mode to landscape mode and the appearance and functionality of the user interface largely remain the same with only modest dimensional changes.

Figure 3K:
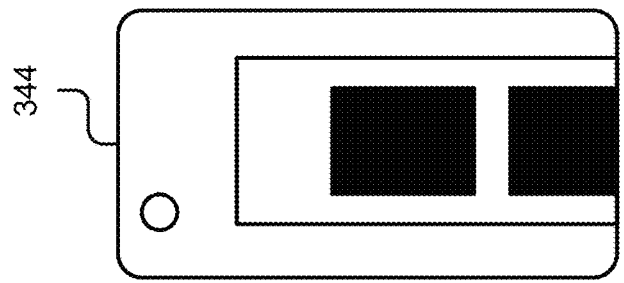
Figure 3J:
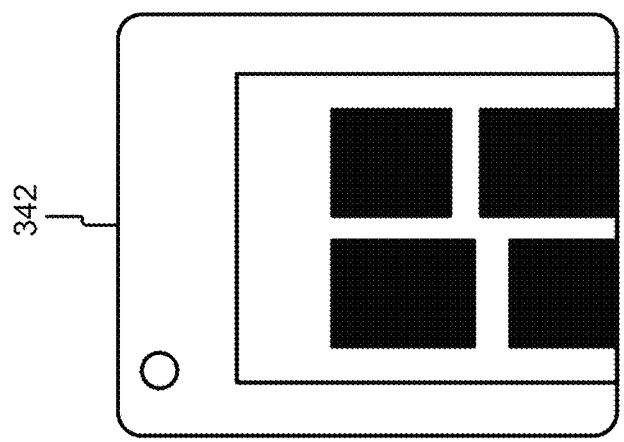
Figure 3I:
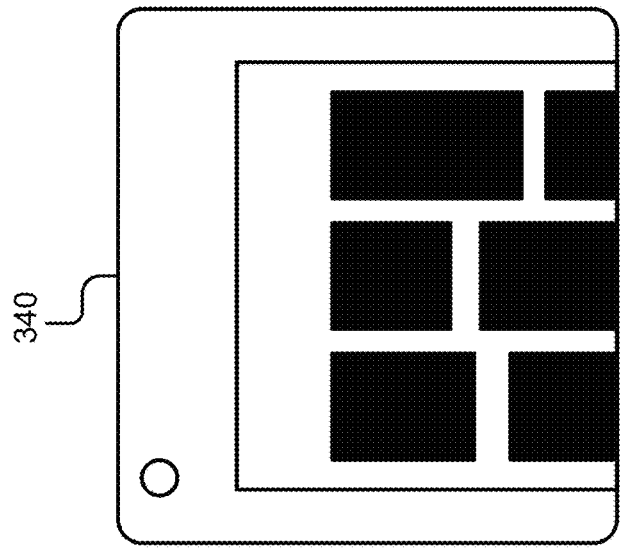

Referring now to FIGS. 3I-3K, three graphic representations of various implementations of the user interfaces 340, 342 and 344 are shown. These FIGS. 3I-3K illustrate how the grid is dynamic and may be incremented in width by the user interface module 230 based on the device upon which the user interface is being presented. In FIG. 3I, the interface 340 is three columns wide while in FIG. 3J the interface 342 is two columns wide and in FIG. 3K the interface 344 is one column wide. This may correspond to the available displayable real estate, e.g., for a desktop computer, a tablet, and a smart phone, respectively.

It should be understood that FIGS. 3A-3K illustrate only the information that is being provided for display on a device at a given time. The user may use inputs to the device, for example, scrolling or gestures (e.g., swiping), to advance the user interface to show additional tiles below or above the tiles currently being shown. For example, FIG. 3K is an interface that provides a linear list of tiles that may be appropriate for display on a smart phone. The tiles are ordered from top to bottom in the list based on their relevance or interestingness to the user. Similarly, FIG. 3J is a dynamic grid two columns wide for placing tiles in configurations described in FIGS. 3A-3H and ordered in that grid from top to bottom of those two columns again in order of relevance or interestingness to the user. In some implementations, the presentation of the tiles is optimized for presentation to the user. For example, the tiles may be ordered at least in part to ensure that there are no blank spaces in the 2×2 visible area. In another example, tile sizes may be selected at least in part to ensure that there are no blank spaces in the 2×2 visible area. In some implementations, as many as ten (10) successor user interfaces are calculated and ordered for a given content stream.

Figure 4:
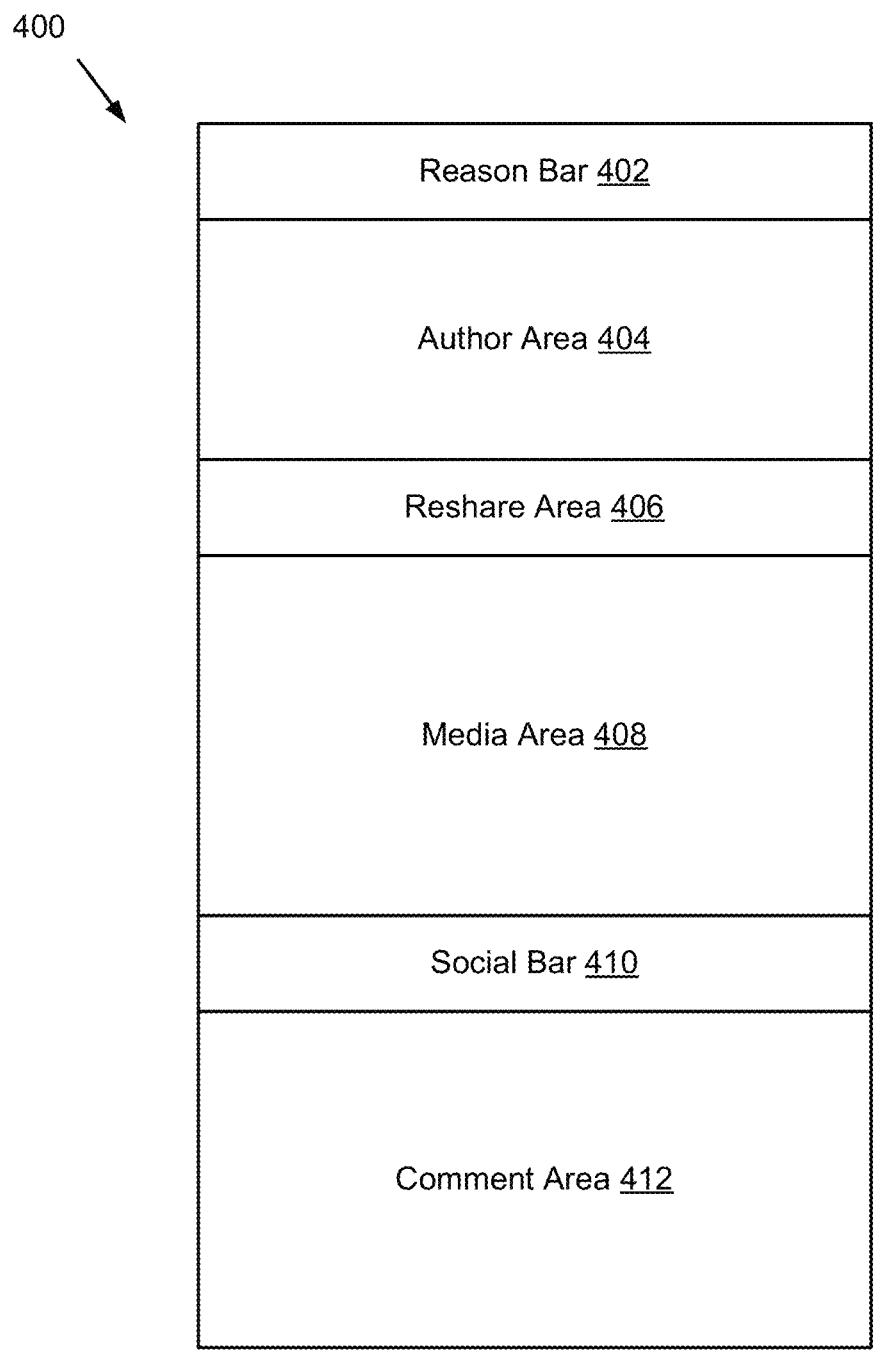
FIG. 4 is a block diagram of example components for a tile.

FIG. 4 is a block diagram of an example of components for a tile 400. The user interface generated by the user interface module 230 may be dynamic in yet another respect. The user interface module 230 generates tiles based upon one or more of the components for tile 400. Many of the components that are described below are optional and may not be included in every tile, for example, when the corresponding content is not available.

Referring now to FIG. 4A, the basic components of a tile 400 include a reason bar 402, an author area 404, a re-share area 406, a media area 408, a social bar 410, and a comment area 412. The reason bar 402 is presented at the top of the tile 400 and provides information about the reason this content item is being displayed to the user, why the content item is in the user's stream or other attribution information. The author area 404 is positioned below the reason bar 402 and provides text information about the author, for example, name, handle, etc. The author area 404 may also include a photo or image used by the author. The author area 404 may also be used to display text that was input by the author. The re-share area 406 appears below the author area 404 and includes tools or buttons that can be used by the reader to share the content item, comment on the content item or take other action with regard to the content item. Below the re-share area 406 is a media area 408. The media area 408 is used to display media or representations of media. For example, photos, emojis, multi-party communications session (e.g., a multi-party video chat) with or without a link to the session, thumbnails of images, representations of videos that are selectable, representations of audio that are selectable, etc., may be displayed in the media area 408. It should be noted that in some implementations the media and its attributes may dictate the size of the tile. For example, when the image is a panoramic image, a medium-sized tile may be used instead of the small-sized tile. A social bar 410 is provided below the media area 408. The social bar 410 may include indications of the number of endorsements or the number of comments, buttons for transitioning to a conversation related to the comment, identification of the author of a comment, an abstract of the comment, etc. In some implementations, the information in the social bar 410 is dynamic and updated in real-time. For example, new comments or authors introduced into the user's stream of content items may be added or removed from the social bar 410 based on a number of social affinity factors. The information provided by the social bar 410 is described in more detail below with reference to FIGS. 8A and 8B. Below the social bar 410 is a comment area 412. The comment area 412 provides the full text of the comments as well as additional information about the authors and is ordered in a different format than the social bar 410. For example, the comment area 412 may provide the comments in reverse chronological order with the most recent comments presented at the top. Although not shown in FIG. 4A, the tile 400 may also include an ad area for including advertisements within the tile. It should be understood that the described order and position of the various bars and areas included in tile 400 is merely one implementation and other implementations using a different position and order exist.

In some implementations, the tile 400 may include additional or different components. For example, in some implementations, the tile 400 components include a title bar with a navigation bar and other buttons (not shown). In some implementations, the title bar is locked to the top of the interface. In some implementations, the tile 400 includes a preposition bar (not shown), e.g., positioned below the title bar, which includes icons for current or popular information. In some implementations, the preposition bar is also used to display community information/posts or location information. In some implementations, the tile 400 includes a location area (not shown). For example, when the user shares the location from which the media was shared or generated, this information may be provided in the location area. Additional information, e.g., links to mapping programs for the location, may also be provided in the location area. In some implementations, the tile 400 includes a photo activity area (not shown) which is separate from the media area 408. Although not shown, the tile 400 components may also include other action pallets, for example, keyboards or emoticons, that can be added to the tile 400 when the content is re-shared, commented upon or endorsed.

Figure 5:
FIG. 5 is a graphic representation of an example user interface that includes tiles with content.

FIG. 5 is a graphic representation of an example user interface 500 that includes tiles 502, 504, 506 with content for a tablet device. As shown in FIG. 5, the user interface 500 includes three tiles 502, 504, 506. The layout of the tiles 502, 504, 506 is similar to that described above with reference to FIG. 3D. However, FIG. 5 shows another variation of the tiles 502, 504, 506 in which they are still rectangular but they are not sized exactly with predefined proportions as set forth in FIGS. 3A-3H. In this implementation, the tile size may have more variance. For example, a first tile 502 is slightly greater than a quarter of the user interface 500 while a second tile 504 has the same width as the first tile 502 but a small portion of it is visible in the interface 500. Likewise the third tile 506 covers more than half the user interface 500. As noted above, in some implementations the user interface module 230 may size the tiles 502, 504, 506 according to the content in the tiles 502, 504 and 506. In this example, the tiles 502, 504, 506 are sized according to the attributes of the media that is included within each tile 502, 504 and 506. The first tile 502 has a picture that is presented in a small tile. The second tile 504 has a selectable link to a video which is also presented in a smaller tile. The third tile 506 includes a photo that is presented in a medium to large tile. Sizing and ordering the tiles based on the type of media included in the tile is merely one implementation.

It should be understood that the order of the tiles and the size of the tiles may be adjusted based upon a variety of factors including: image resolution, image orientation, album resolution, the amount of text, social data (e.g., interestingness of the content, whether the user is following an author, closeness in the social graph of the author to the user, closeness in the social graph of commenter to the user, proximity of location of the user to the content, diversity, number of endorsements, number of re-shares, number of comments, affinity to the author, recommended by the system, and various other social signals), and any combination of the foregoing. For example, when the image resolution of photo included within a tile is low, that content item may be assigned to a small tile. In contrast, when the image resolution of the photo is high, that content item may be assigned a large tile. Similarly, when a content item includes 3 photos that have narrow width dimensions (skinny), the 3 skinny photos may only require a small sized tile; however, when the content item includes 3 photos that have a normal landscape orientation, a medium sized tile, for example, tile C 306 of FIG. 3B may be used to provide the content item in a tile on a grid.

Another feature of the tiles 502, 504, 506 that is advantageous is that some of the functionality provided by the tiles 502, 504, 506 is accessible when the tiles 502, 504, 506 are displayed on the grid, e.g., as shown in FIG. 5. For example, the tiles 502, 504, 506 need not be transitioned to a more detailed interface, e.g., those of FIGS. 6A-6C, to access functionality. For example, assuming tile 506 is showing one photo of a photo album, using the interface grid level as shown in FIG. 5, the user needs only swipe left or right (or scroll left or right) on the photo of tile 506 to update the tile 506 to show the next photo in the photo album in tile 506. Essentially, this allows the user in the stream view of the dynamic grid to view a bunch of photos from a photo album. Similarly, this access to functionality may be extended to any action buttons on tiles that are visible to the user in the dynamic grid view of FIG. 5. Examples of action buttons include, but are not limited to, endorsement buttons, sharing buttons, comments, etc. Similarly, swipe left or right (or scroll left or right) on the tile can be used to access content above or below the tile. In some implementations, scrolling or gestures (e.g., swiping) may be used within a tile to expand or contract content of the tile.

Figure 6A:
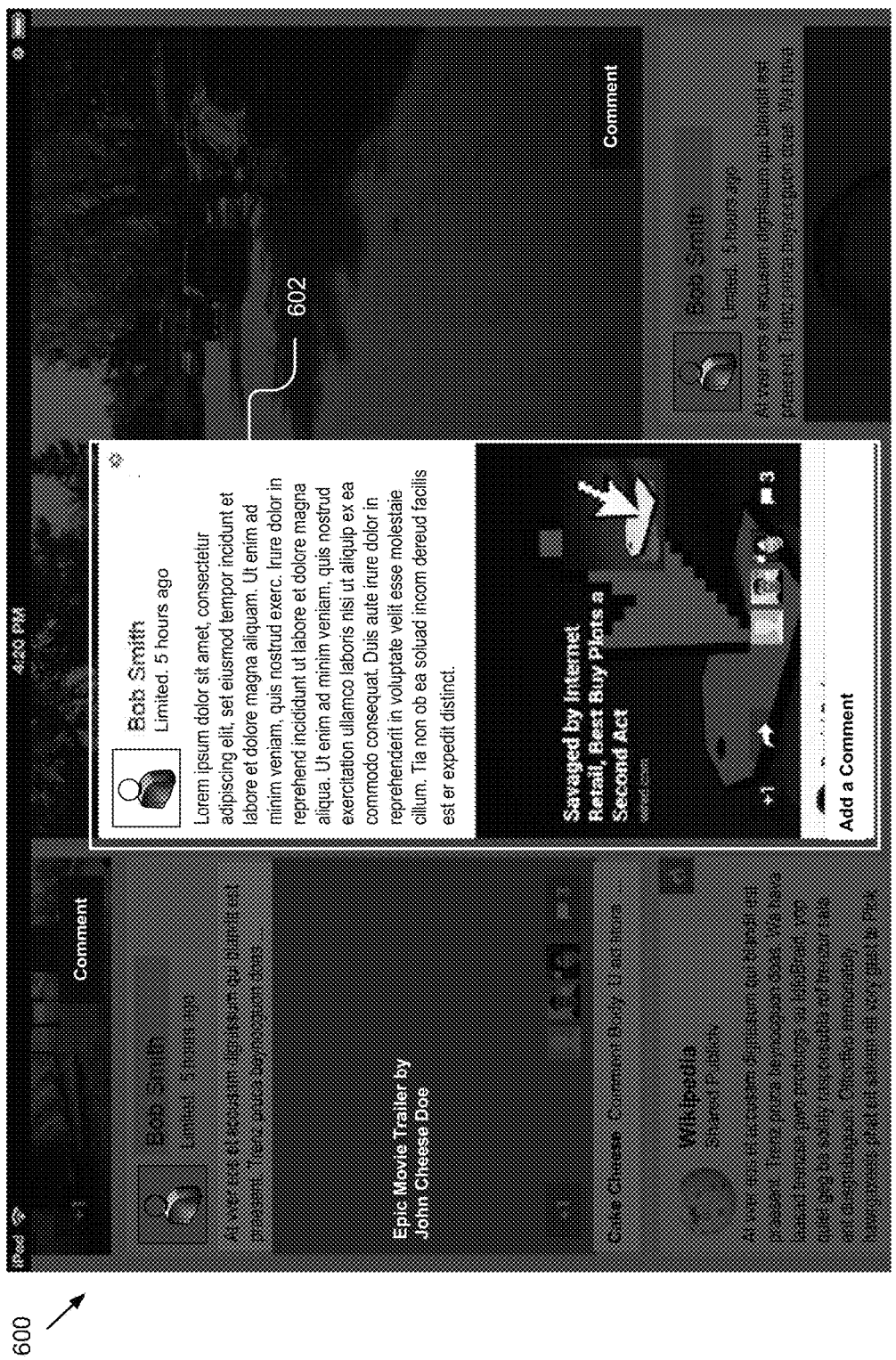
FIGS. 6A-C are graphic representations of example user interfaces with additional detail for tiles from the interface of FIG. 5.
Figure 6B:
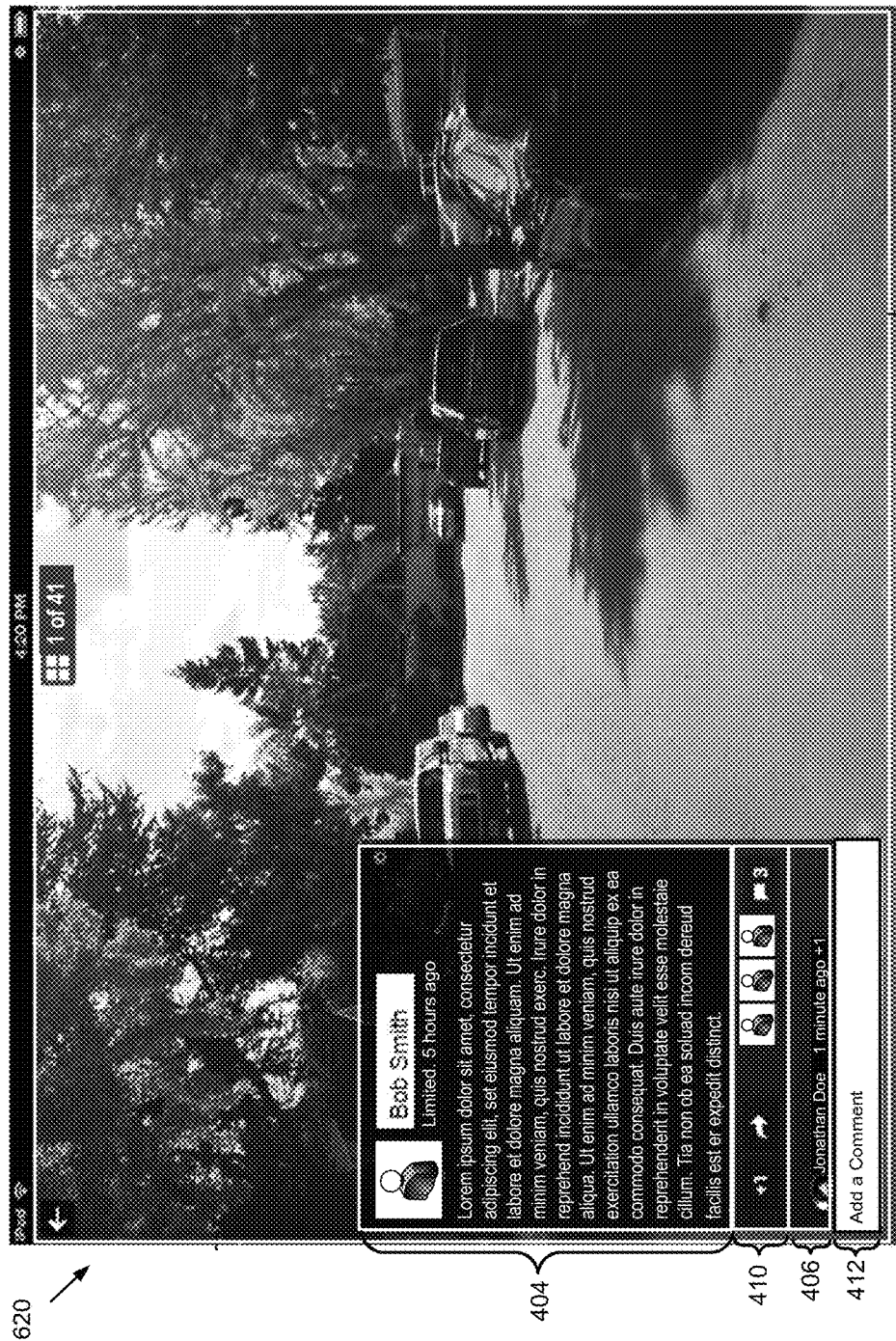
Figure 6C:
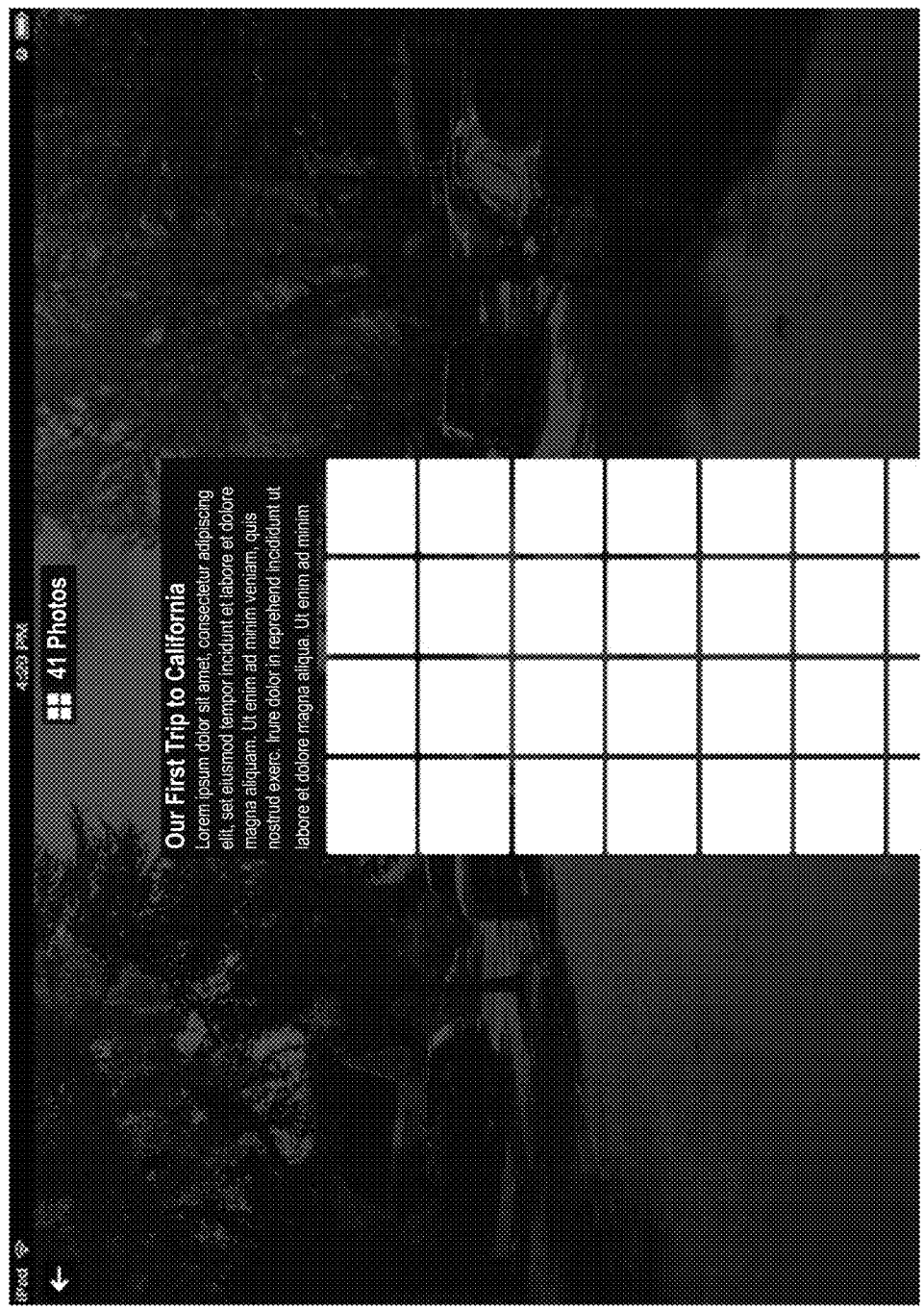

Referring now also to FIGS. 6A-6C, the transitions between interfaces 500, 600, 620 and 640 is described. With the user interface 500 being displayed, the user may select a tile 502, 504, 506, for example, by inputting a selection command or by tapping on the tile 502, 504, 506 and the user interface transitions from the interface 500 shown in FIG. 5 to a corresponding interface 600, 620 and 640 shown in FIGS. 6A-6C.

More specifically, in some implementations, when the first tile 502 is selected, the display transitions from the user interface 500 to user interface 600 shown in FIG. 6A. The user interface 600 has an expanded version of the tile 602 with the full text associated with the content item. Additionally, the user interface advantageously presents the tile 602 overlaid upon a shaded version of the user interface 500 from which the user has transitioned. This is particularly advantageous because it allows the user to review more detailed information about the content item while having the context of the item displayed in a shaded manner. A comparison of the two tiles 502, 602 illustrates how much more text from the content item is shown. It should be understood that this is merely one example of a tile including more detailed information and the more detailed information that may be provided. Another example is that a photo or any other component associated with the content item or tile may be shown in expanded format.

When the third tile 506 is selected, the display transitions from the user interface 500 to user interface 620 shown in FIG. 6B. The transition between the user interface 500 of FIG. 5 and the user interface 620 of FIG. 6B shows another implementation for transitioning between interfaces. In this implementation, the media area 408 (e.g., the photo) the tile is expanded to be shown in full screen and the author area 404, re-share area 406, social bar 410 and comment area 412 are overlaid on the media area 408. This implementation is particularly advantageous because it allows almost all the information associated with the content item to be presented to the user in a single user interface. The portion of the other components 404, 406, 410 and 412 of the tile are overlaid over the media area 408 at the bottom left corner. This has the advantage of minimally obstructing the view of the media area. It should be understood that this overlay could be positioned at various other positions within the interface 620.

In some implementations, when the third tile 506 is selected, the display transitions from the user interface 500 to user interface 640 shown in FIG. 6C. The transition between the user interface 500 of FIG. 5 and the user interface 640 of FIG. 6C shows another implementation for transitioning between interfaces. In this implementation, a photo album presented with images in a grid is overlaid upon the media area 408 (e.g., photo) expanded to cover the full screen. The new tile shown in FIG. 6C may include a button to allow the user to transition to the photo album and indicating the number of photos, associated text, and a grid of the first n thumbnail images of the photos from the photo album. It should be understood that FIG. 6A, 6B and 6C are merely three examples of how additional details from a content item may be presented in a secondary interface accessed through the primary interface 500 of FIG. 5.

Figure 7A:
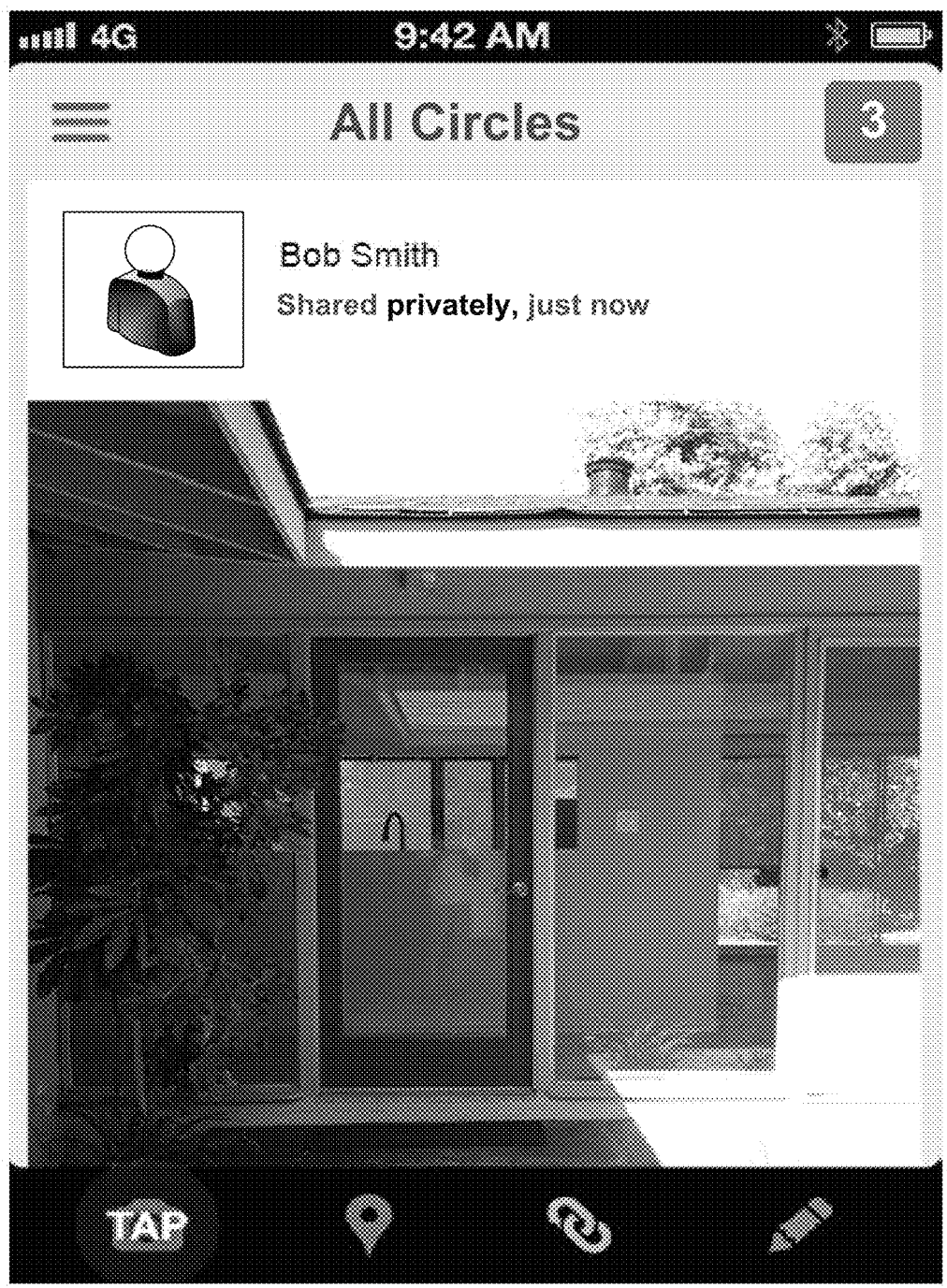
FIGS. 7A-7C are graphic representations of example user interfaces that include tiles with content for a mobile device.
Figure 7B:
Figure 7C:
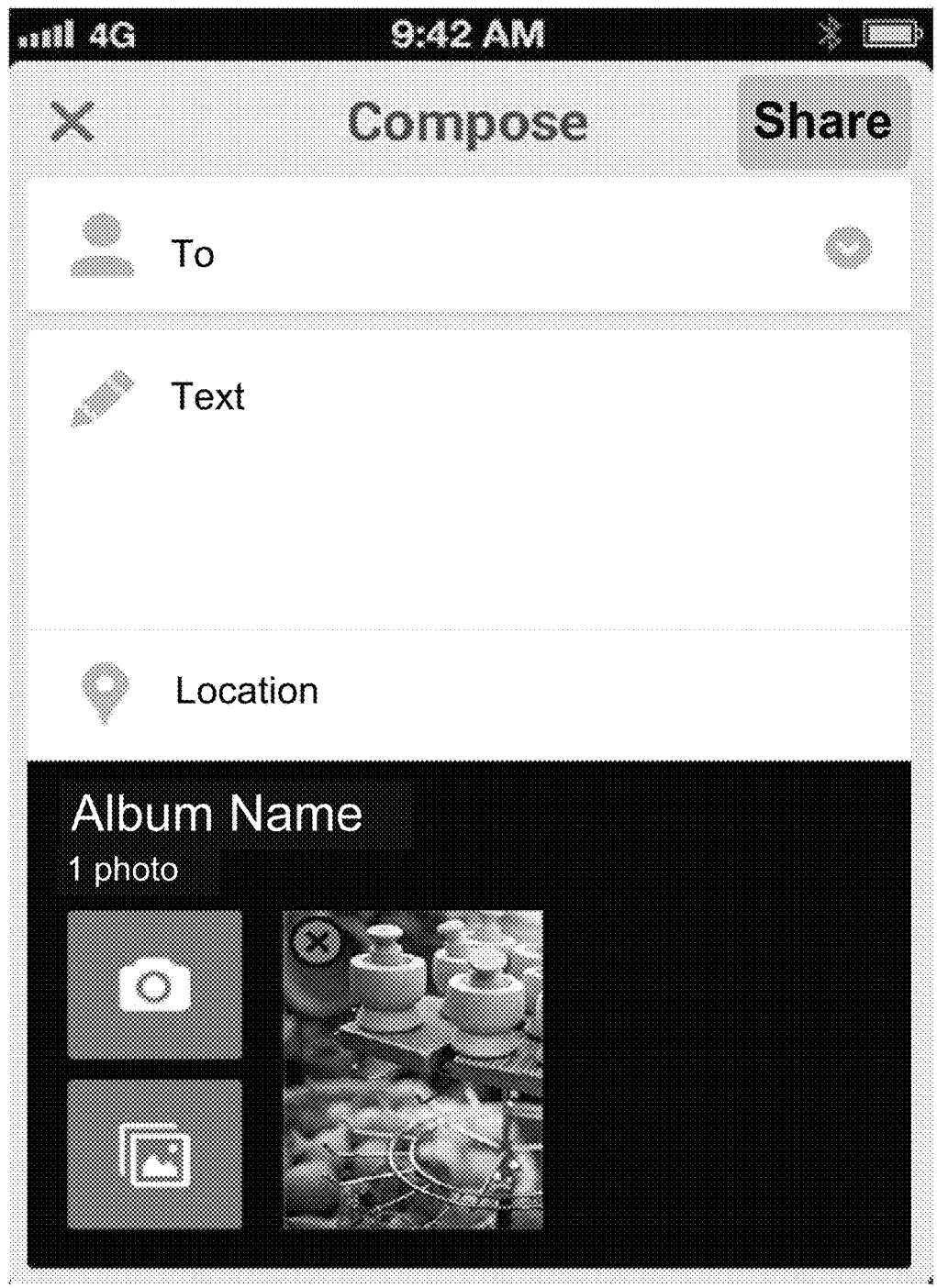

Referring now to FIGS. 7A-7C, graphic representations of example user interfaces for a mobile device are described. FIG. 7A illustrates how the tile components may be presented in a reduced fashion as a single tile for a mobile device. FIG. 7B illustrates how a photo album can be presented in a tile for mobile device. FIG. 7C illustrates an implementation of how a secondary interface for composing a share or comment on a tile may be presented. It should be understood that the components of the tile may be reduced in size, reducing content or completely eliminated from presentation on a mobile device. Similarly, buttons or functionality offered by the tile may also be reduced or eliminated to accommodate the functionality available on the mobile device.

Figure 8A:
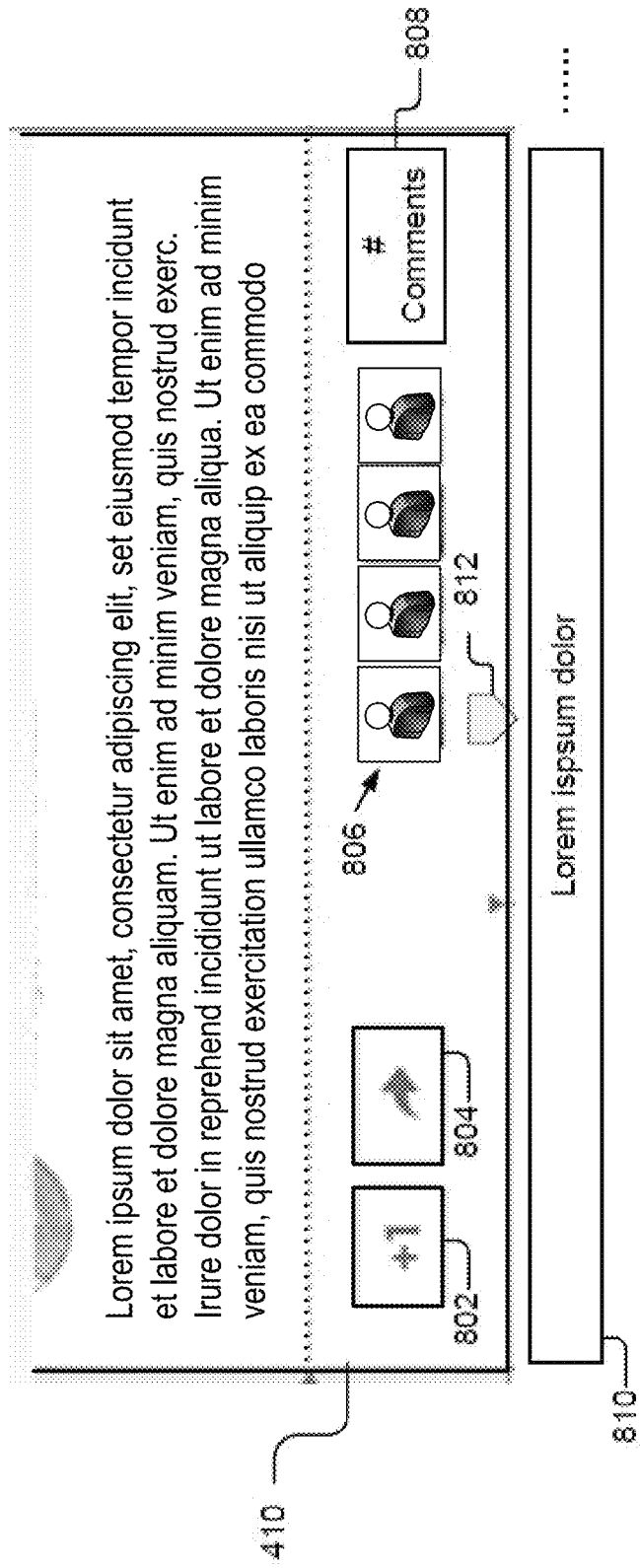
FIGS. 8A and 8B are graphic representations of an example social bar.
Figure 8B:
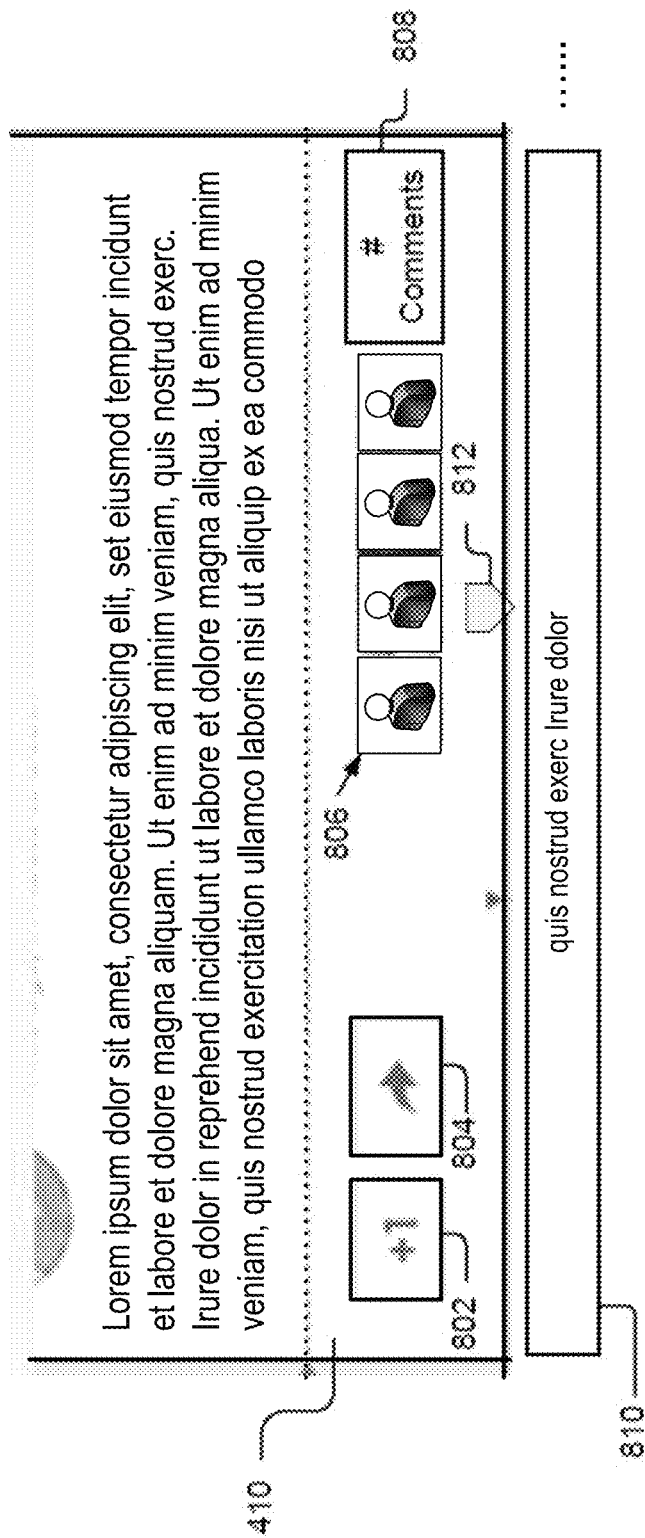

FIGS. 8A and 8B are graphic representations of an example social bar 410. FIG. 8A shows an implementation for the social bar 410. In this implementation, the social bar 410 includes an endorsement button 802, an expansion button 804, a list of commenters 806, an indication of the number of comments 808, a comments box 810, and an indicator 812 that identifies the commenter that made the comments in the comment box 810. In some implementations, the endorsement button 802 causes the interface to transition to another interface that allows the user to endorse the content presented in the tile. The expansion button 804 transitions the interface (e.g., interface 600) to another interface (e.g., interface 620) where more information about the content item is displayed in an individual expanded tile. The list of commenters 806 is a list of users that have posted comments about the content item in the tile. In some implementations, images of the commenters are shown. For example, FIG. 8A shows 4 commenters and their images. In some implementations, names or handles rather than images are presented in 806. In some implementations, the commenters most related to the user are added to the list of commenters 806. In some implementations, the commenters that are added to the list of commenters 806 can be determined by relevance, for example, a threshold related to one or more of affinity to the user, proximity in time, whether the commenter is endorsed or followed by the user, whether the commenter is popular or often endorsed, etc. is satisfied and the commenter is added to the list of commenters 806. In some implementations, the list of commenters 806 is dynamically updated in real-time as new comments are added to the user stream. It should be understood that as new comments are received those commenters satisfying the threshold and included in the list 806 may change such that the commenters in the list 806 are dynamic. The number of comments indicator 808 tells the user how many comments have been posted about the content item in the tile. The comment box 810 provides the comment or a portion of the comment. In some implementations, the comments provided for presentation to the user in the comment box 810 are changed at predetermined intervals. For example, comments from different users may be transitioned through the comment box 810 like a ticker tape. As another example, comments may be changed at predetermined intervals of time (e.g., every 15 seconds). The indicator 812 is used to indicate the user to which the comment corresponds. For example in FIG. 8A, the comment in the comment box 810 corresponds to the first user and the indicator 812 is positioned below the image of the first user to indicate that the first user is the source of the comment. By comparison, in FIG. 8B, the comment in the comment box corresponds to a second user, the user to the right of the first user, and the indicator 812 is positioned below the image of the second user to identify that the second user is the source of the comment. In some implementations, the comment box 810 is updated and cycles through each of the users shown in the list of commenters 806 and as the comments are changed the indicator 812 moves to be positioned under the user that is the source of the comment. It should be recognized that the indicator 812 is merely one example of an indicator and that other indicators exist.

Figure 9:
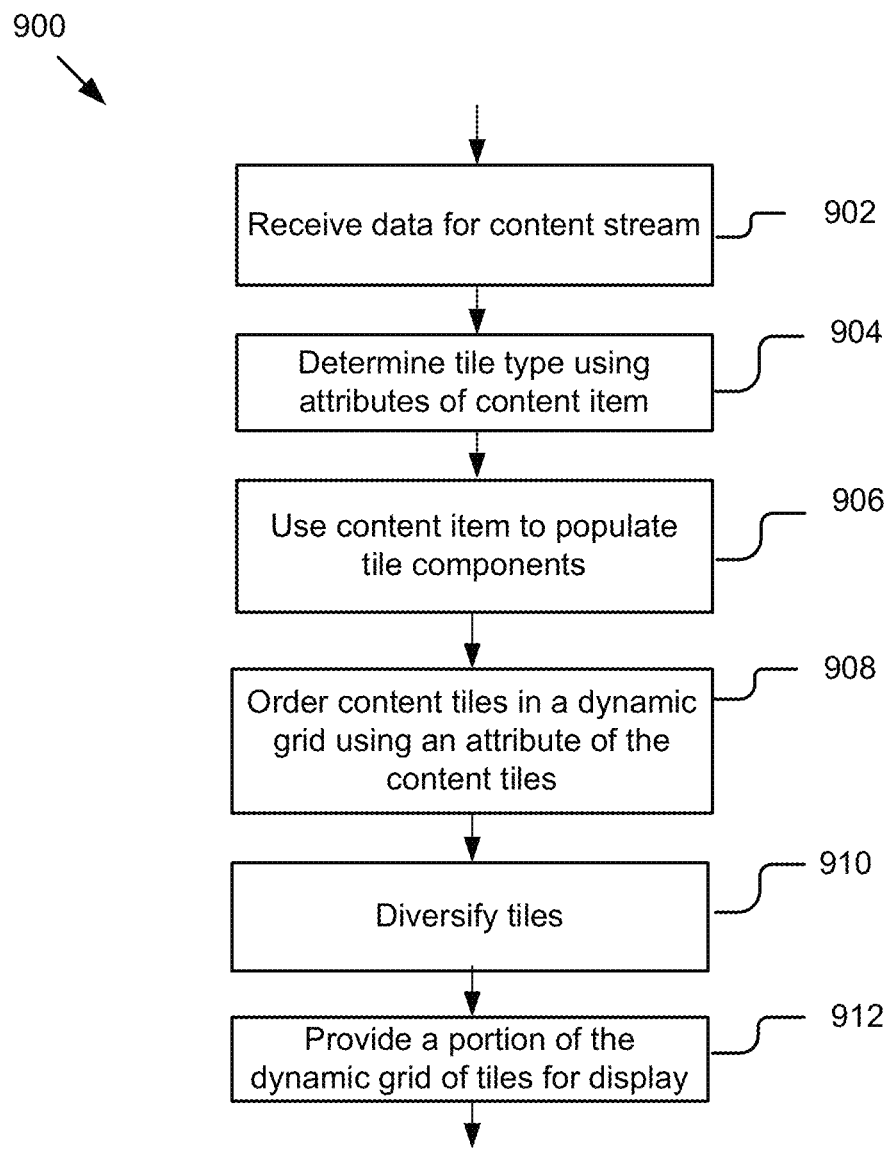
FIG. 9 is a flow diagram of an example method for generating a user interface including a dynamic grid having one or more tiles.

Referring now to FIG. 9, an example method 900 for generating a user interface including a dynamic grid having one or more tiles is described. The method 900 begins by receiving 902 a stream of content including one or more content items. For example, the stream of content may be received by the user interface module 230 from the content application 103. The user interface module 230 selects a content item from the stream of content. The user interface module 230 then determines 904 a tile type for providing the content item based upon an attribute of the content item. For example, an attribute of the content item may be media and its attributes, image resolution or any of the factors described above with reference to FIG. 5. Next, the method 900 uses 906 the content item to populate the tile components. Then the method organizes content tiles in a dynamic grid using the attribute of the content items. The content tiles may be ordered 908 in the dynamic grid using the attributes of the content files. For example, the tiles may be ordered according to two rules: first making sure there is no blank space in the dynamic grid (e.g., 2×2 grid) provided to the user and second providing the tiles in order of relevance with the more relevant content being presented at the top of the grid. In some implementations, the method 900 continues by diversifying 910 the tiles. The tiles may be diversified based upon the type of content presented, type or size of tile presented, source of content for tile or other factors. As noted above, in some implementations up to 10 interfaces are generated. For example, assuming a 2×2 dynamic grid is visible to the user, in some implementations, a grid of 2×20 is arranged and created so that successive portions of the 2×20 grid can be provided to the user in response to input to transition to successive portions of the grid. The method continues by providing 912 a portion of the dynamic grid of tiles for display.

In some implementations, a tile may have a predefined maximum size. In some such implementations, the step of populating 906 the tile components with content from the content item may include an iterative process of reducing the size of different components until the sum of the components' sizes is below the maximum size for a tile. For example, the processes may be to first reduce the size of text, then to reduce the size photo, then to reduce functionality provided in the tile and then evaluate whether the tile size is below the maximum allowed. If so, the tile is populated; if not, the method may select each of the components again and determine whether their size cannot be reduced until the total size of all the components is below the maximum allowed. Additionally or alternatively, certain components of the tile may be eliminated if the tile size needs to be reduced. In some implementations, a tile may have a predefined minimum size. In some such implementations, content items with no additional media or little content may be expanded. In such an example, the size of the font of text may be increased, the icon size may be increased, or other buttons may be added to reduce the amount of whitespace for a tile that has limited content.

Figure 10:
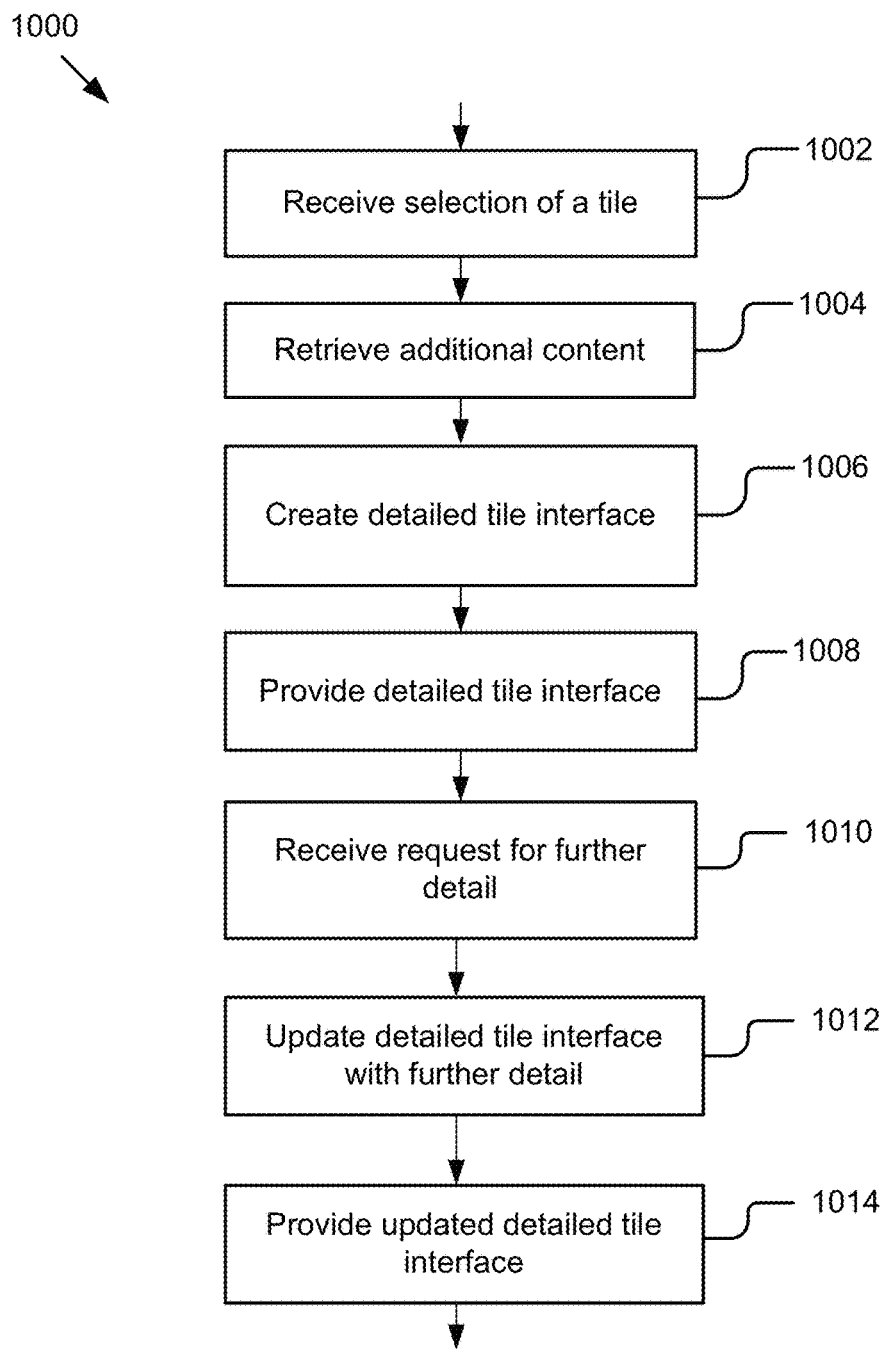
FIG. 10 is a flow diagram of an example method for generating a user interface providing detailed information about a tile from a dynamic grid of tiles.

FIG. 10 shows an example method 1000 for generating a user interface providing detailed information about a tile from a dynamic grid of tiles. The method 1000 begins by receiving 1002 an input selecting a tile in the dynamic grid. The method 1000 identifies the tile and the content item associated with the input, and then retrieves 1004 additional information related to the content item. Then the user interface module 230 creates 1006 the detailed tile interface. The detailed tile interface is populated with the information retrieved in step 1004. Then the detailed tile interface is provided 1008 for display to the user. The user may input additional commands to manipulate the secondary interfaces. The user interface module 230 receives 1010 a request for further detail about the content item. The detailed user interface is updated 1012 with additional information and the updated detailed user interface is provided 1014 for display to the user. An example of this method is shown in the interfaces of FIG. 6A and 6B. These user interfaces can receive input to retrieve additional text other than that provided and displayed. In such cases, the user can scroll to additional text below the text currently displayed in the user interfaces shown FIG. 6A and 6B. This additional text is retrieved and the interface is updated and provided back to the user as described above in steps 1012 and 1014.

In some implementations, when additional text is provided and the user scrolls through that text, the detailed user interface is automatically closed and the user returns to the initial dynamic grid tile interface. In some implementations rather than automatically closing the secondary user interface, a button is provided when the user reaches the end of the text to make that transition. For example, when the user scrolls to the end of text in interface 602 of FIG. 6A, the interface would automatically transition back to interface 500 of FIG. 5. It should be understood that the secondary user interfaces may have a variety of different mechanisms to return to the interface 500 of FIG. 5. For example, various features may include a pull to close, pull to show next post, scroll past the end to automatically close, pull to retrieve next post or release to close.

Figure 11:
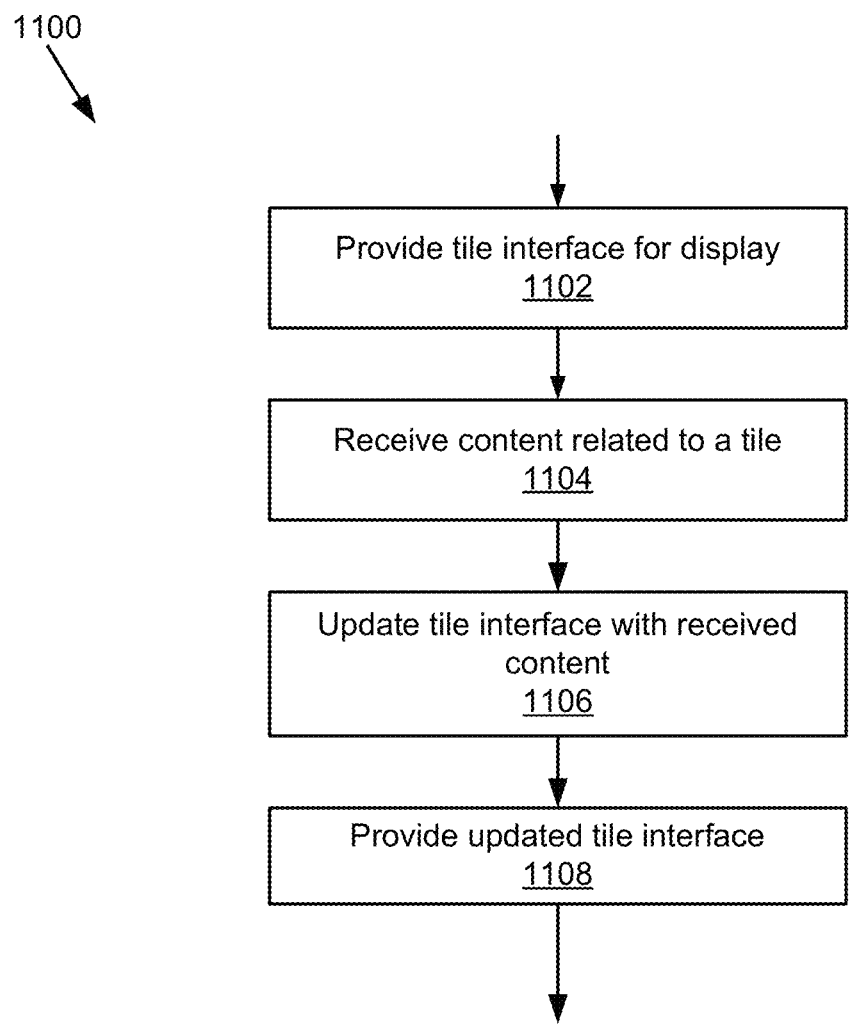
FIG. 11 is a flow diagram of an example method for updating a tile or dynamic grid in real-time for new content.
Figure 12A:
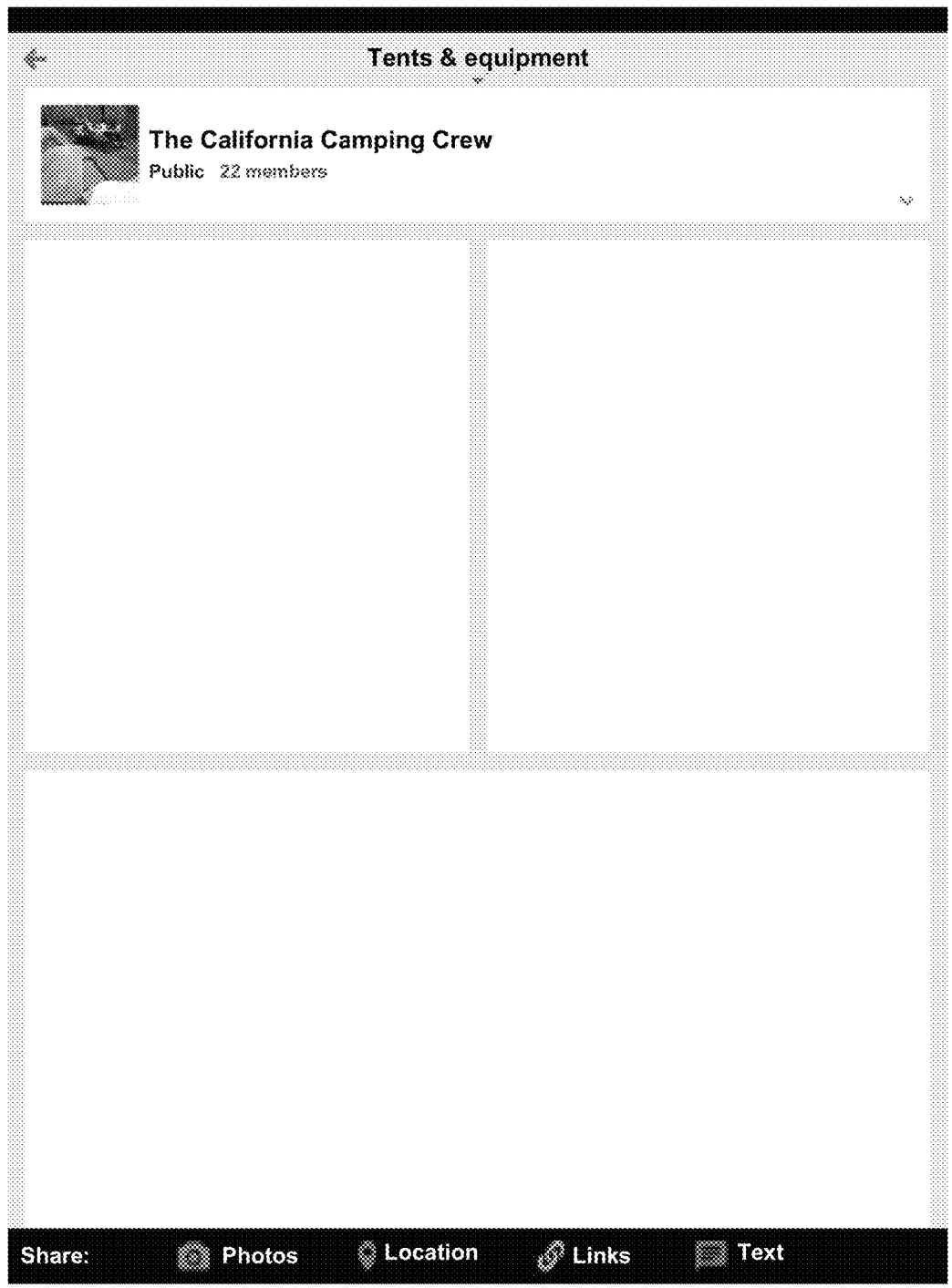
FIGS. 12A-12I are graphic representations of example user interfaces for interacting with communities.
Figure 12B:
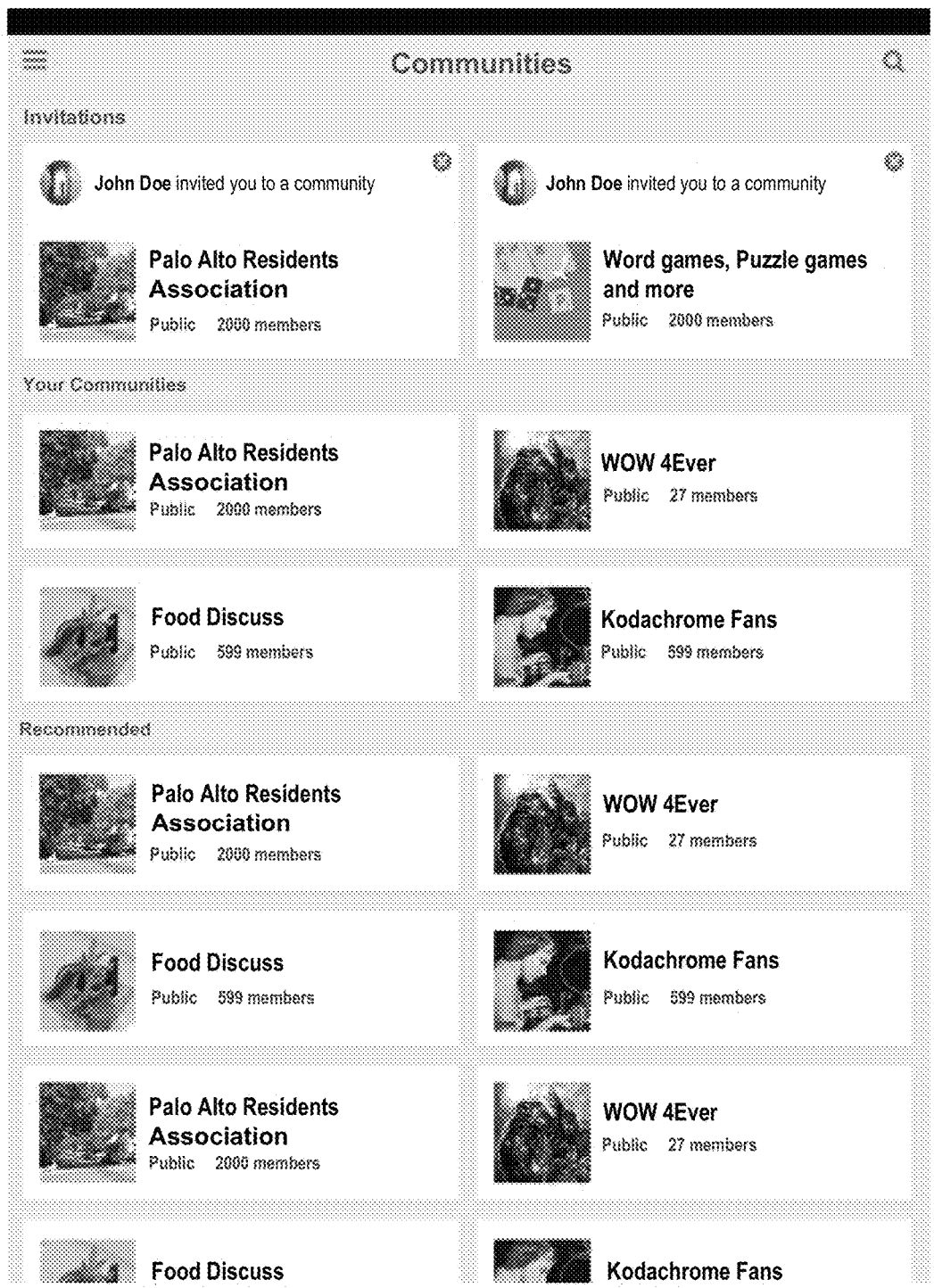
Figure 12C:
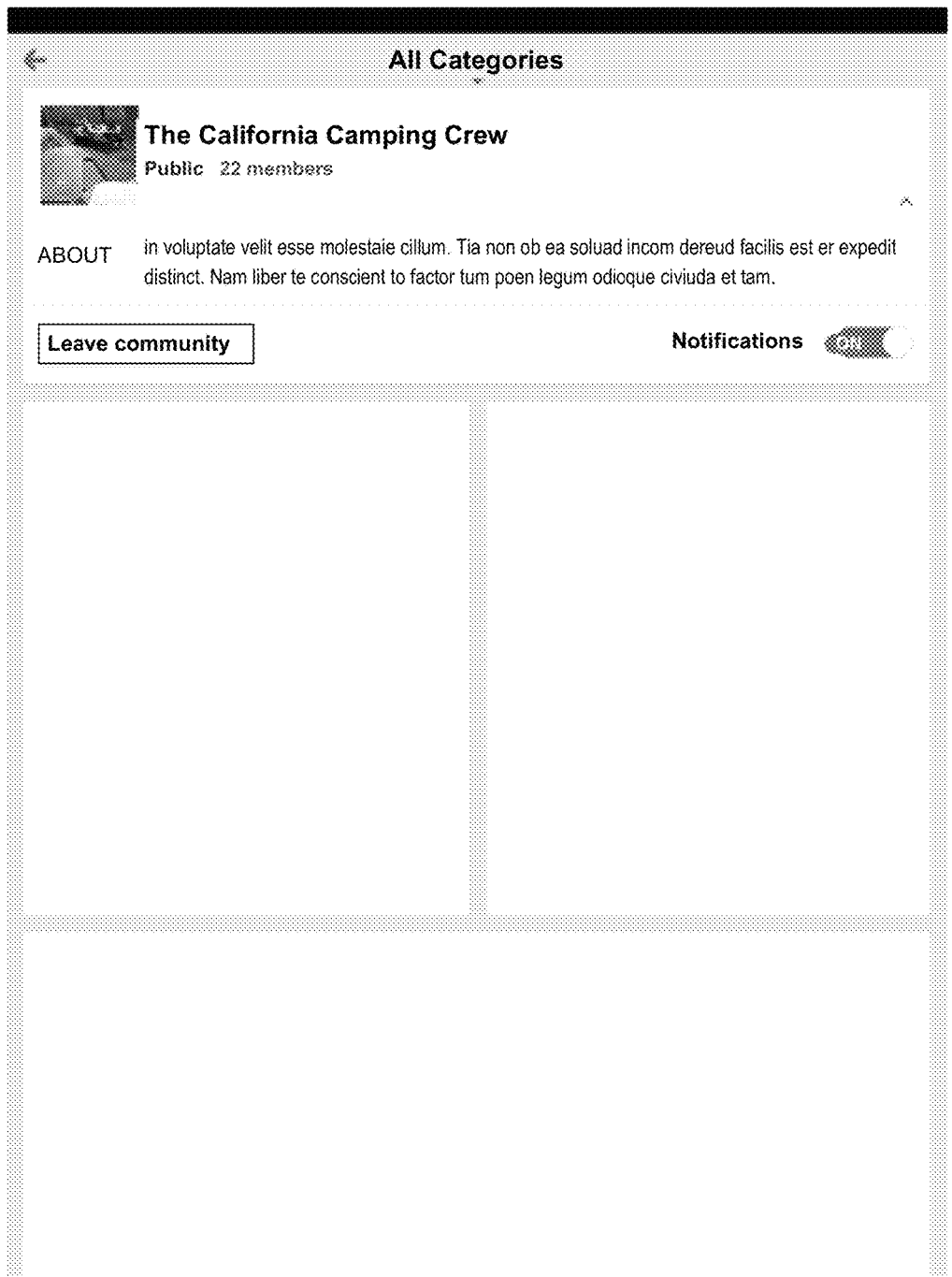
Figure 12D:
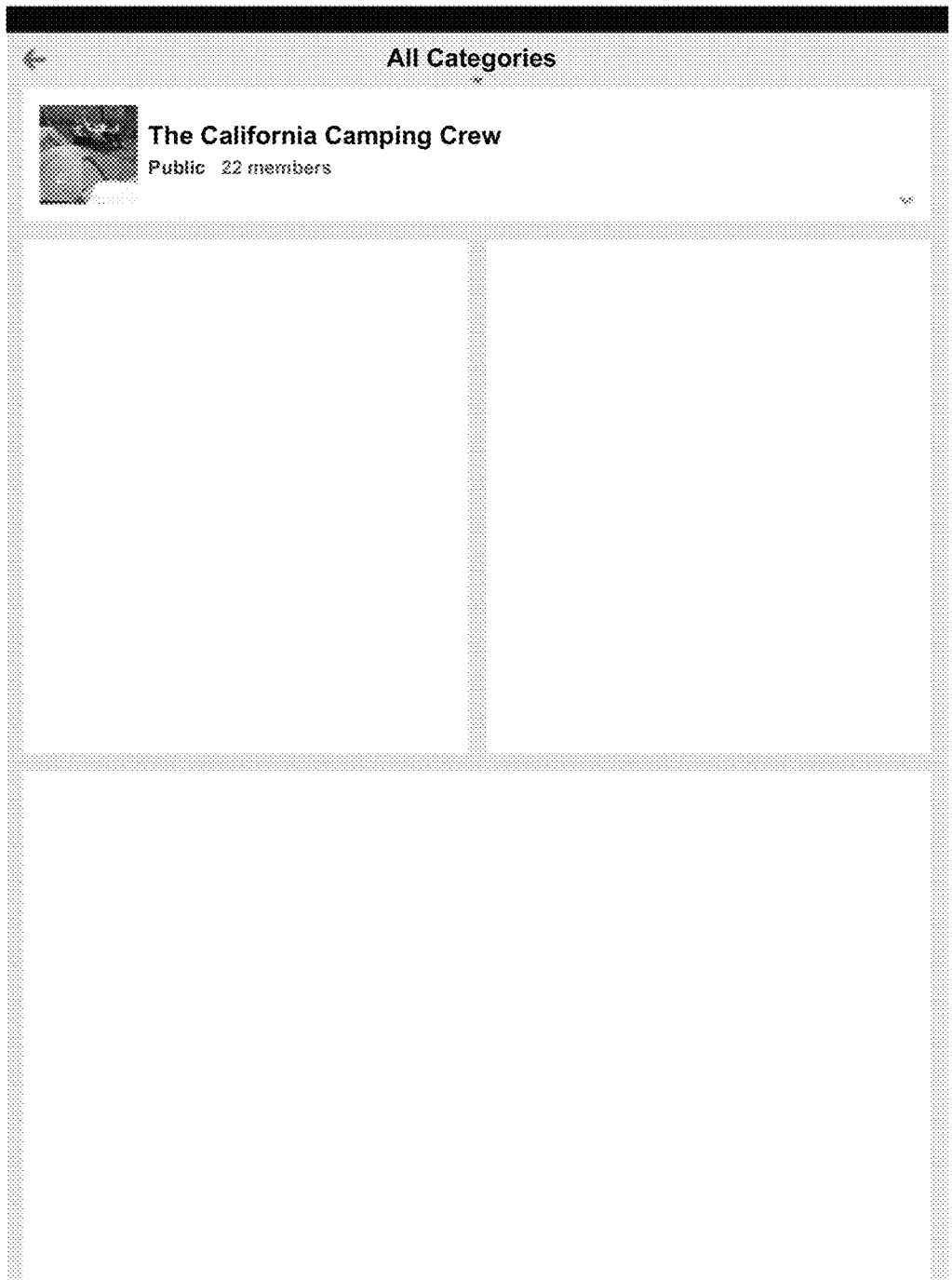
Figure 12E:
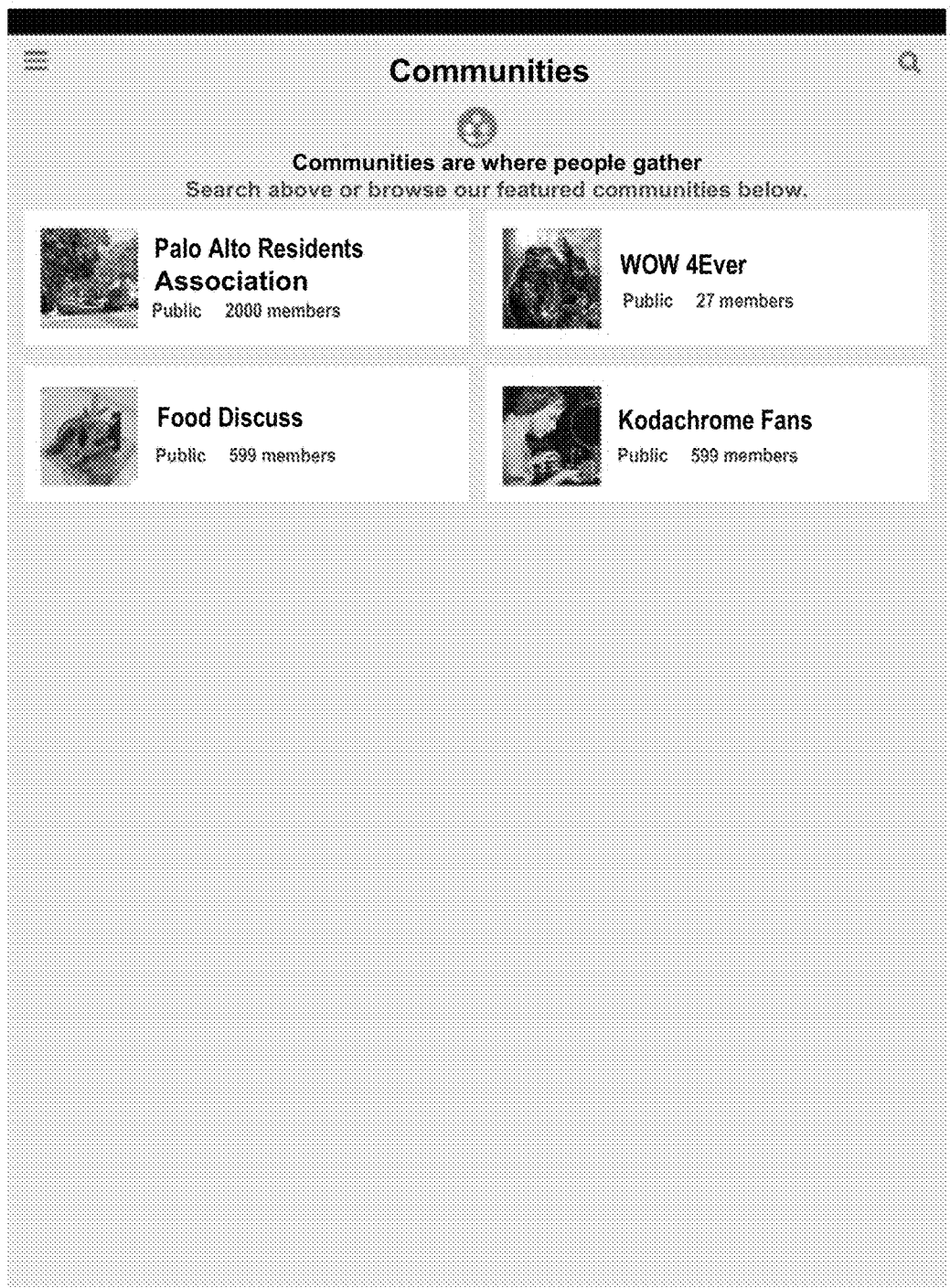
Figure 12F:
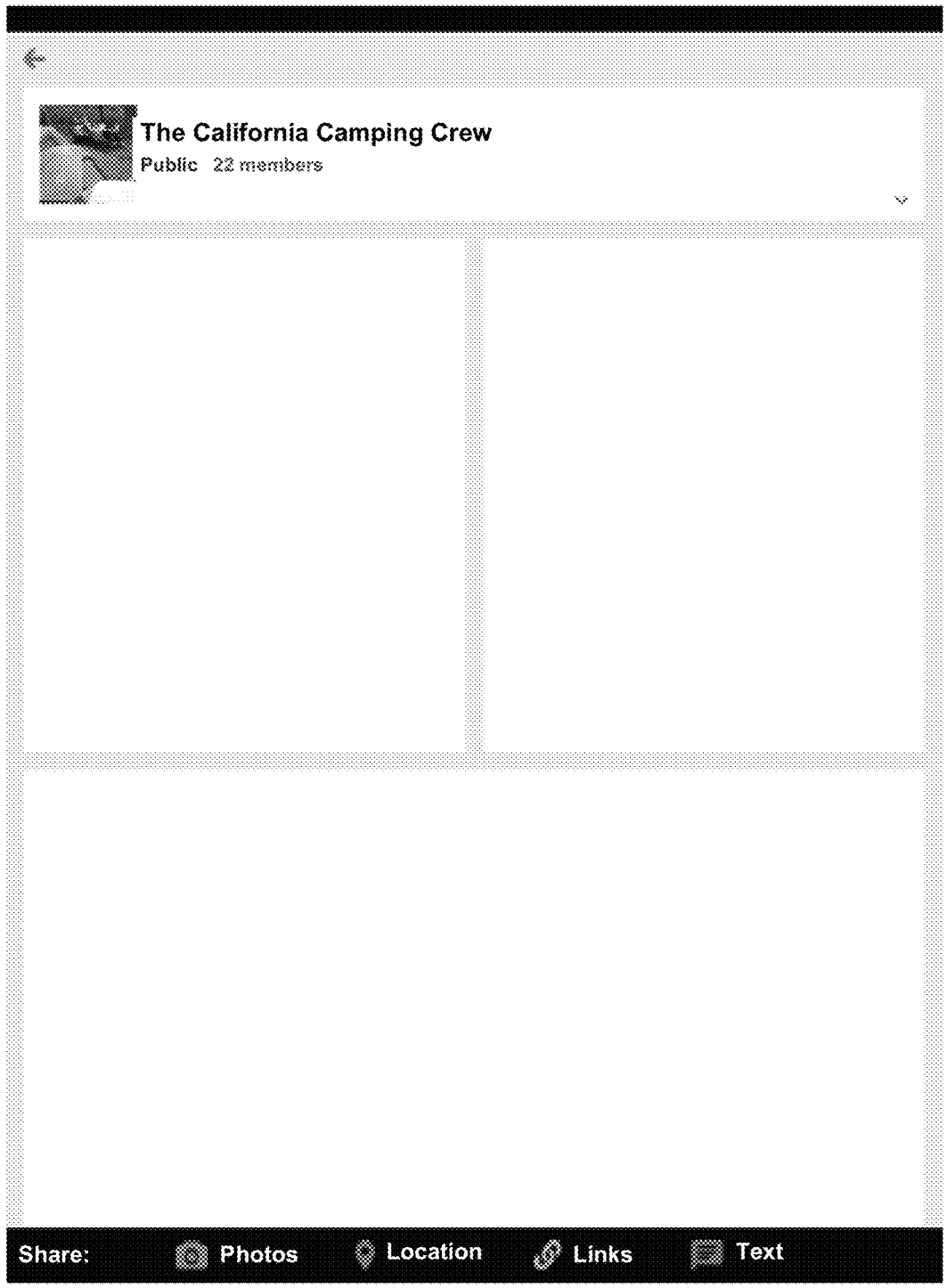
Figure 12G:
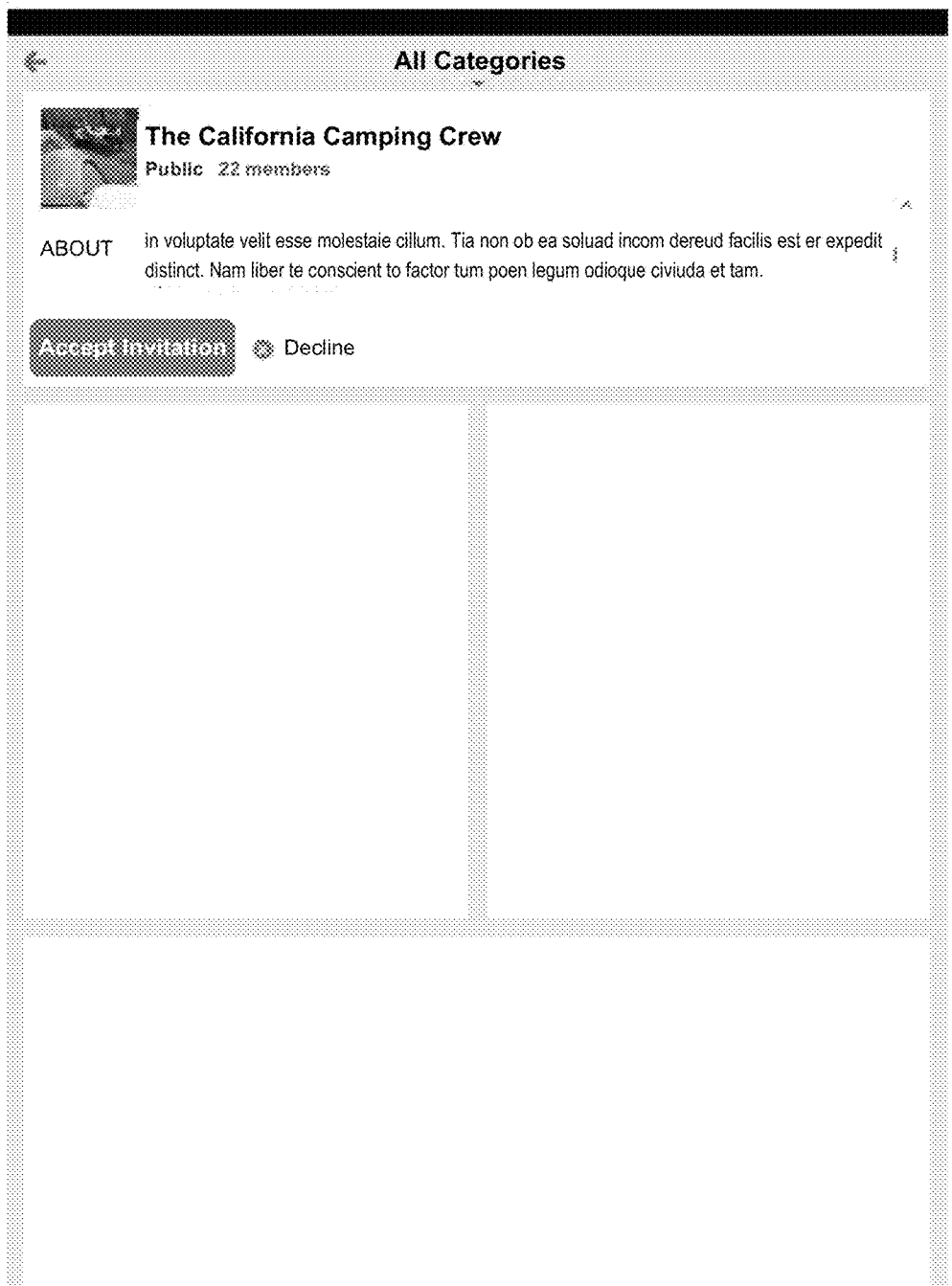
Figure 12H:
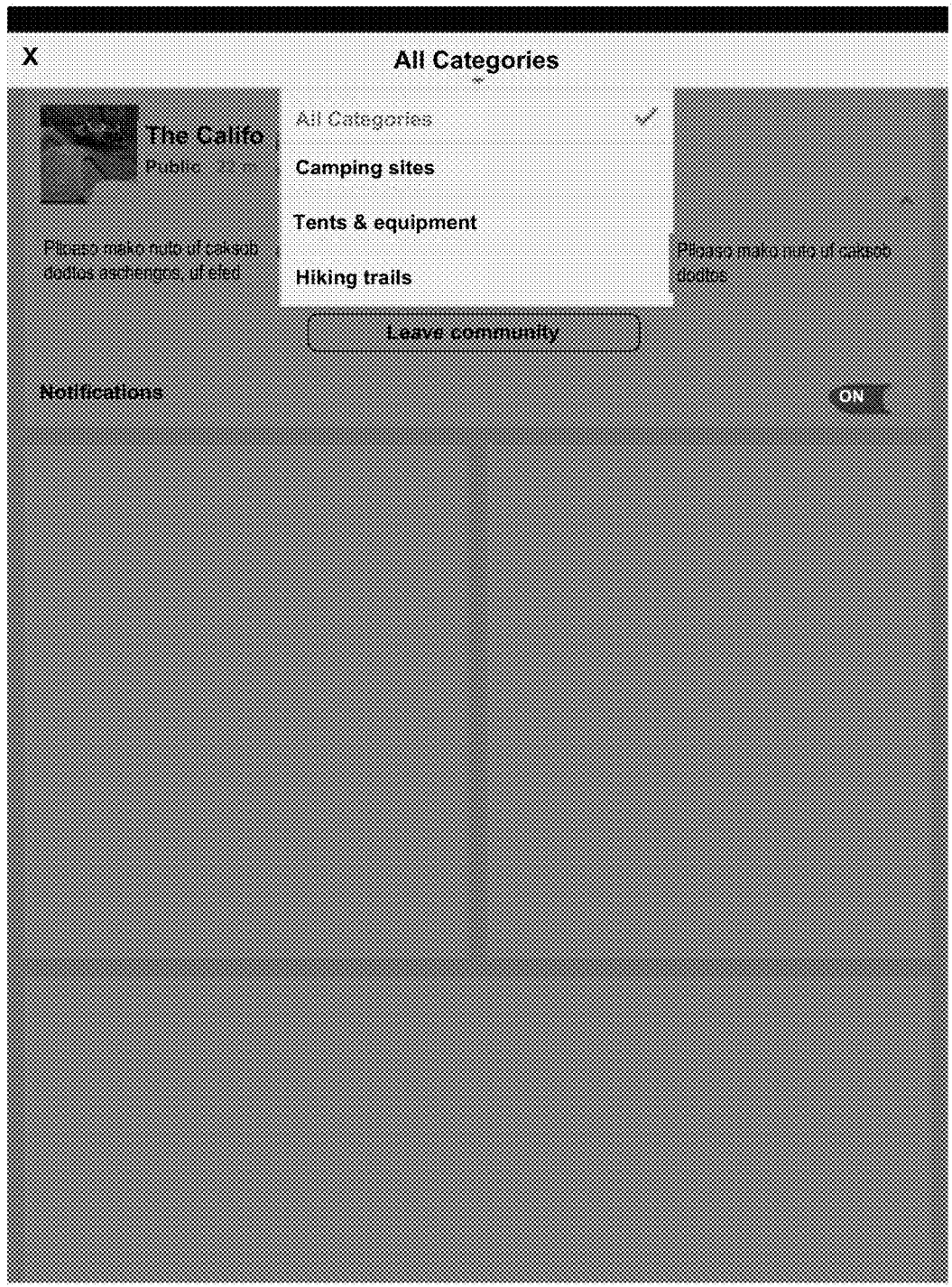
Figure 12I:
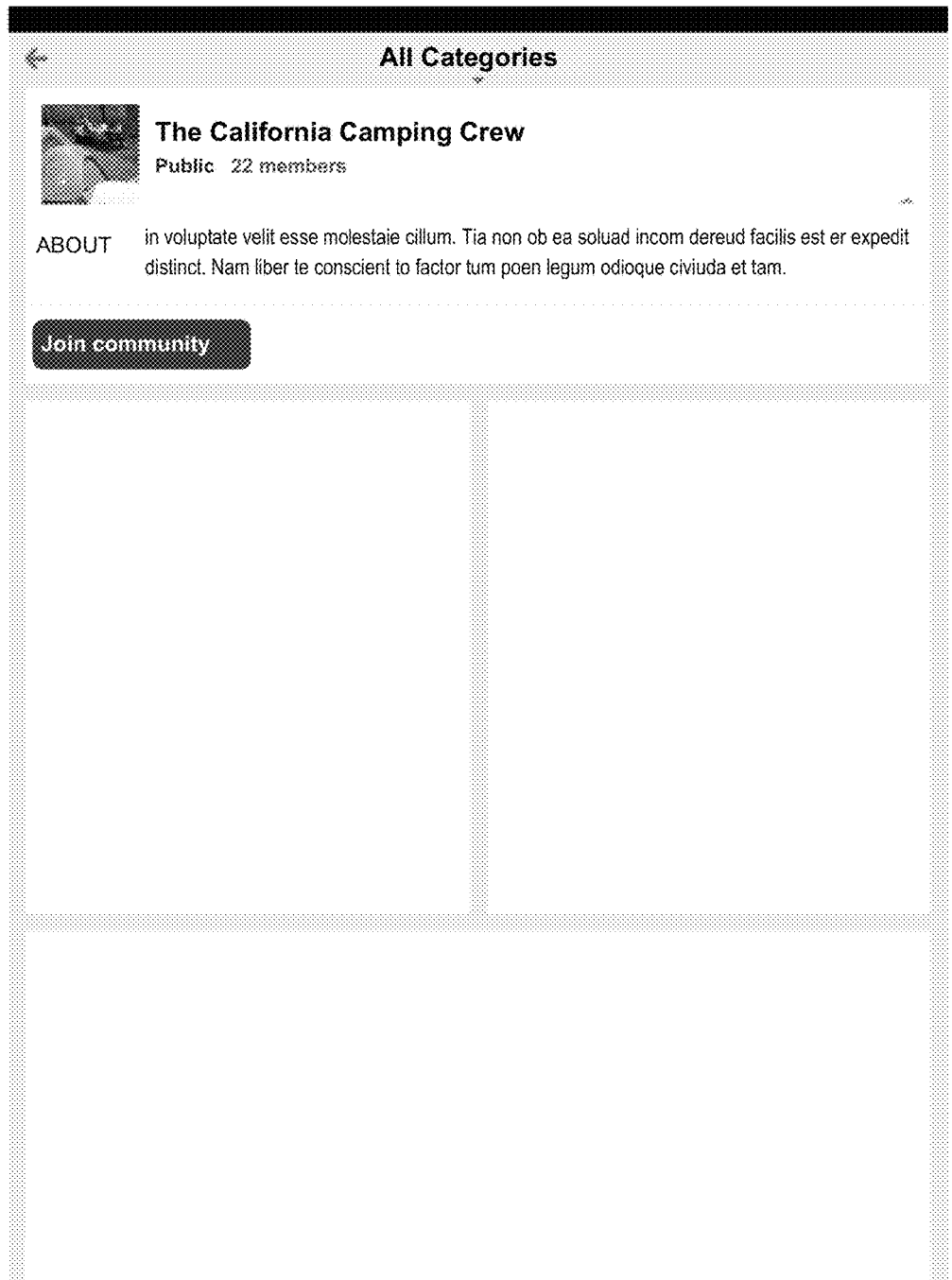

FIG. 11 shows an example method 1100 for updating a tile or dynamic grid in real-time for new content. The method 1100 begins by providing 1102 a tile or a dynamic grid interface for display. Next the user interface module 230 receives 1104 content related to a tile or dynamic grid that is being displayed. The user interface module 230 updates 1106 the interface with the new content that was received and provides 1108 the updated tile interface for display to the user.

Referring now to FIGS. 12A-12I, additional example user interfaces for interacting with communities are shown. Other sources of content include communities which may be public or private, but are groups of users that are interested in a particular topic and want to exchange information about a particular topic or subject matter of interest. The information exchanged may include, but is not limited to one or more of posts, blogs, comments, shares, photos, movies, audio, rich conversations, multi-party communication sessions, etc. The topics can be about anything and the formation of communities on topics is dynamic and adaptive. The interfaces, systems and methods described above can also be applied to communities and be used to provide a similar user experience and ease of interaction. The user interfaces in FIGS. 12A-12I can be adapted to have dynamic grid organization, use tiles to present different portions of the user interfaces shown in FIGS. 12A-12I, and have modified tiles with functions specific to communities, e.g., creating a community, joining a community and sharing media of various types with the community.

In the above description, for purposes of explanation, numerous specific details are indicated in order to provide a thorough understanding of the technology described. It should be apparent, however, that this technology may be practiced without these specific details. In other instances, structures and devices are shown in block diagram form in order to avoid obscuring the technology. For example, the present technology is described with some implementations below, with reference to user interfaces and particular hardware. However, the present technology applies to any type of computing device that may receive data and commands, and any devices providing services.

Moreover, the present technology is described above primarily in the context of creating and providing personas in social networks for the purpose of filtering connections, content, and applications, relating to users of the social networks, based on the personas; however, the present technology may apply to any type of online communities and other applications beyond just online communities. In particular, this technology for creating personas and filtering connections, content, and applications relating to the users of the social networks, based on persona types, may be used in other contexts besides social networks.

Reference in the specification to "one implementation or instance," "an implementation or instance," or "some implementations or instances" simply means that one or more particular features, structures, or characteristics, described in connection with the one or more implementations or instances is included in at least one or more implementations or instances that are described. Any appearance of the phrase "in one implementation or instance" in various places in the specification is not necessarily referring to the same implementation or instance.

Some portions of the detailed descriptions above are presented in terms of algorithms and symbolic representations of operations on data bits within a computer memory of either one or more computing devices. These algorithmic descriptions and representations are the means used in the data processing arts to most effectively convey the substance of their work to others. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing the terms "processing," "computing," "calculating," "determining," or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. Such a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology may take the form of an entirely hardware implementation, an entirely software implementation, or an implementation including both hardware and software components. In some implementations, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that may include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times, code must be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

The algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description above. In addition, the present technology is not described with reference to any particular programming language. It should be understood that a variety of programming languages may be used to implement the technology as described here.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent, the modules, routines, features, attributes, methodologies, and other aspects of the present technology can be implemented as software, hardware, firmware, or any combination of the three. Also, wherever a component, an example of which is a module, of the present technology is implemented as software, the component can be implemented as a stand-alone program, as part of a larger program, as a plurality of separate programs, as a statically or dynamically linked library, as a kernel loadable module, as a device driver, and/or in every and any other way known now or in the future to those in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A system comprising:
   a processor; and
   a memory storing instructions that, when executed, cause the system to:
   receive a stream of content including one or more content items for a first user;
   select a content item associated with a second user the content item including a photo;
   determine a tile size of a content tile for providing the content item in a dynamic grid based upon a plurality of attributes of the content item,
   the plurality of attributes including
      an image resolution of the photo included in the content item and
      a closeness in a social graph between the first user and the second user;
   populate tile components of the content tile using the content item,
      tile components including a media area that displays the photo and an activity area;
   enable the first user to provide an input for updating of the content item with the input from the first user,
      the input being provided via the activity area of the content tile within the dynamic grid;

organize content tiles in the dynamic grid using the plurality of attributes of the content items;
provide the dynamic grid of content tiles for display;
receive a selection of the content tile in the dynamic grid; and
responsive to the selection of the content tile in the dynamic grid,
receive additional information related to the content item;
populate a secondary user interface tile with the additional information, the secondary user interface tile including the media area, the activity area, an author area, and a social bar area; and
display the secondary user interface tile with the additional information overlaid on the media area.

2. The system of claim 1, wherein the activity area is a re-share area and the secondary user interface tile includes a reason bar and a comment area.

3. The system of claim 1, wherein the secondary user interface tile is displayed over the dynamic grid.

4. The system of claim 3, comprising: instructions stored in the memory that, when executed, cause the system to:
receive a second input;
remove the secondary user interface tile for display; and
restore the display of the dynamic grid of content tiles.

5. The system of claim 1, wherein the social bar identifies an author of a comment and displays a portion of the comment.

6. The system of claim 5, wherein the social bar is dynamically updated with new authors that have posted comments.

7. The system of claim 5, wherein the social bar includes a comment window and different portions of comments are dynamically displayed in the window.

8. A method comprising:
receiving, using one or more processors, a stream of content including one or more content items for a first user;
selecting, using the one or more processors, a content item associated with a second user, the content item including a photo;
determining, using the one or more processors, a tile size of a content tile for providing the content item based upon a plurality of attributes of the content item,
the plurality of attributes including an image resolution of the photo included in the content item and a closeness in a social graph between the first user and the second user;
populating, using the one or more processors, tile components of the content tile using the content item, the tile components including a media area that displays the photo and an activity area;
enabling, using the one or more processors, the first user to provide an input for updating of the content item with the input from the first user,
the input being provided via the activity area of the content tile within the dynamic grid;
organizing, using the one or more processors, content tiles in the dynamic grid using the plurality of attributes of the content items;
providing, using the one or more processors, the dynamic grid of content tiles for display;
receiving, using the one or more processors, a selection of the content tile in the dynamic grid; and
responsive to receiving the selection of the content tile in the dynamic grid,
receiving additional information related to the content item;
populating a secondary user interface tile with the additional information, the secondary user interface tile including the media area, the activity area, an author area, and a social bar area; and
displaying the secondary user interface tile with the additional information overlaid on the media area.

9. The method of claim 8, wherein the activity area is a re-share area and the secondary user interface tile includes a reason bar and a comment area.

10. The method of claim 8, wherein the secondary user tile interface is displayed over the dynamic grid.

11. The method of claim 10, comprising: receiving a second input; removing the secondary user interface tile for display; and restoring the display of the dynamic grid of content tiles.

12. The method of claim 8, wherein at the social bar identifies an author of a comment and displays a portion of the comment.

13. The method of claim 12, wherein the social bar is dynamically updated with new authors that have posted comments.

14. The method of claim 12, wherein the social bar includes a comment window and different portions of comments are dynamically displayed in the window.

15. A computer program product comprising a non-transitory computer usable medium including a computer readable program, wherein the computer readable program when executed on a computer causes the computer to:
receive a stream of content including one or more content items for a first user;
select a content item associated with a second user, the content item including a photo;
determine a tile size of a content tile type for providing the content item in a dynamic grid based upon a plurality of attributes of the content item,
the plurality of attributes including an image resolution of the photo included in the content item and a closeness in a social graph between the first user and the second user;
populate tile components of the content tile using the content item
tile components including a media area displaying the photo and an activity area;
enable the first user to provide an input for updating of the content item with the input from the first user,
the input being provided via the activity area of the content tile within the dynamic grid;
organize content tiles in a dynamic grid using the attribute of the content items;
provide the dynamic grid of content tiles for display;
receive a selection of the content tile in the dynamic grid; and
responsive to the selection of the content tile in the dynamic grid,
receive additional information related to the content item;
populate a secondary user interface tile with the additional information, the secondary user interface tile including the media area, the activity area, an author area, and a social bar area; and
display the secondary user interface tile with the additional information overlaid on the media area.

16. The computer program product of claim 15, wherein the activity area is a re-share area and the secondary user interface tile includes a reason bar and a comment area.

17. The computer program product of claim 15, wherein the secondary user interface tile is displayed over the dynamic grid.

18. The computer program product of claim 17, wherein the computer readable program when executed on a computer causes the computer to receive a second input; remove the secondary user interface tile for display; and restore the display of the dynamic grid of content tiles.

19. The computer program product of claim 15, wherein the social bar identifies an author of a comment and displays a portion of the comment.

20. The computer program product of claim 19, wherein the social bar is dynamically updated with new authors that have posted comments.

21. The computer program product of claim 19, wherein the social bar includes a comment window and different portions of comments are dynamically displayed in the window.

* * * * *